(12) United States Patent
Kleinerman et al.

(10) Patent No.: US 12,348,350 B2
(45) Date of Patent: Jul. 1, 2025

(54) JOINT SAMPLE RATE OFFSET AND SYMBOL TIMING OFFSET CORRECTION

(71) Applicant: Skyworks Solutions, Inc., Irvine, CA (US)

(72) Inventors: Alexander Kleinerman, Austin, TX (US); Connor William Blasie, Austin, TX (US); Bradley Arthur Wallace, Austin, TX (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 18/376,782

(22) Filed: Oct. 4, 2023

(65) Prior Publication Data

US 2024/0121147 A1    Apr. 11, 2024

Related U.S. Application Data

(60) Provisional application No. 63/413,562, filed on Oct. 5, 2022, provisional application No. 63/443,643, filed on Feb. 6, 2023, provisional application No. 63/443,635, filed on Feb. 6, 2023, provisional application No. 63/451,335, filed on Mar. 10, 2023.

(51) Int. Cl.
H04L 27/26        (2006.01)
(52) U.S. Cl.
CPC ............................... H04L 27/2662 (2013.01)
(58) Field of Classification Search
CPC .................................................. H04L 27/2662
USPC ......................................................... 375/354
See application file for complete search history.

(56) References Cited

U.S. PATENT DOCUMENTS

| 7,469,013 | B1 | 12/2008 | Bolt et al. |
| 9,160,589 | B1 | 10/2015 | Ramlall |
| 9,742,611 | B2 * | 8/2017 | Elenes ................ H04L 27/2662 |
| 11,140,014 | B1 * | 10/2021 | Kleinerman ........ H04L 27/2605 |
| 11,652,667 | B2 | 5/2023 | Kleinerman |
| 2003/0008691 | A1 | 1/2003 | Chen et al. |
| 2004/0196915 | A1 * | 10/2004 | Gupta ................... H04L 27/266 |
| | | | 375/260 |
| 2007/0287382 | A1 | 12/2007 | Catreux-Erceg et al. |
| 2008/0123760 | A1 | 5/2008 | Oh et al. |
| 2008/0165908 | A1 | 7/2008 | Vrcelj et al. |
| 2008/0212727 | A1 | 9/2008 | Jahan et al. |
| 2009/0003423 | A1 | 1/2009 | Oh et al. |
| 2009/0052561 | A1 | 2/2009 | Baxley et al. |
| 2009/0245092 | A1 | 10/2009 | Sampath et al. |
| 2010/0166050 | A1 * | 7/2010 | Aue ..................... H04L 27/2676 |
| | | | 375/224 |

(Continued)

OTHER PUBLICATIONS mathworks.com, "Channel Estimation—MATLAB & Simulink," Oct. 10, 2020, 8 pages total.

*Primary Examiner* — Kevin M Burd
(74) *Attorney, Agent, or Firm* — Knobbe, Martens, Olson & Bear, LLP

(57) ABSTRACT

A receiver has a sample rate converter that outputs samples of orthogonal frequency division multiplexing symbols. The receiver includes a fast Fourier transform engine that receives the samples and converts them into a plurality of frequency domain sub-carriers. A timing control circuit generates a timing error and controls the sample rate converter to adjust a sample rate of the orthogonal frequency division multiplexing symbols based at least in part on the timing error.

20 Claims, 15 Drawing Sheets

(56) References Cited

U.S. PATENT DOCUMENTS

| | | |
|---|---|---|
| 2010/0284499 A1 | 11/2010 | Lindoff |
| 2010/0322357 A1 | 12/2010 | Krasny et al. |
| 2013/0156138 A1 | 6/2013 | Nie et al. |
| 2013/0343499 A1 | 12/2013 | Ren et al. |
| 2014/0204991 A1 | 7/2014 | Huang et al. |
| 2018/0013592 A1 | 1/2018 | Liu et al. |
| 2018/0167235 A1 | 6/2018 | Hu et al. |
| 2019/0109747 A1 | 4/2019 | Hessler et al. |

\* cited by examiner

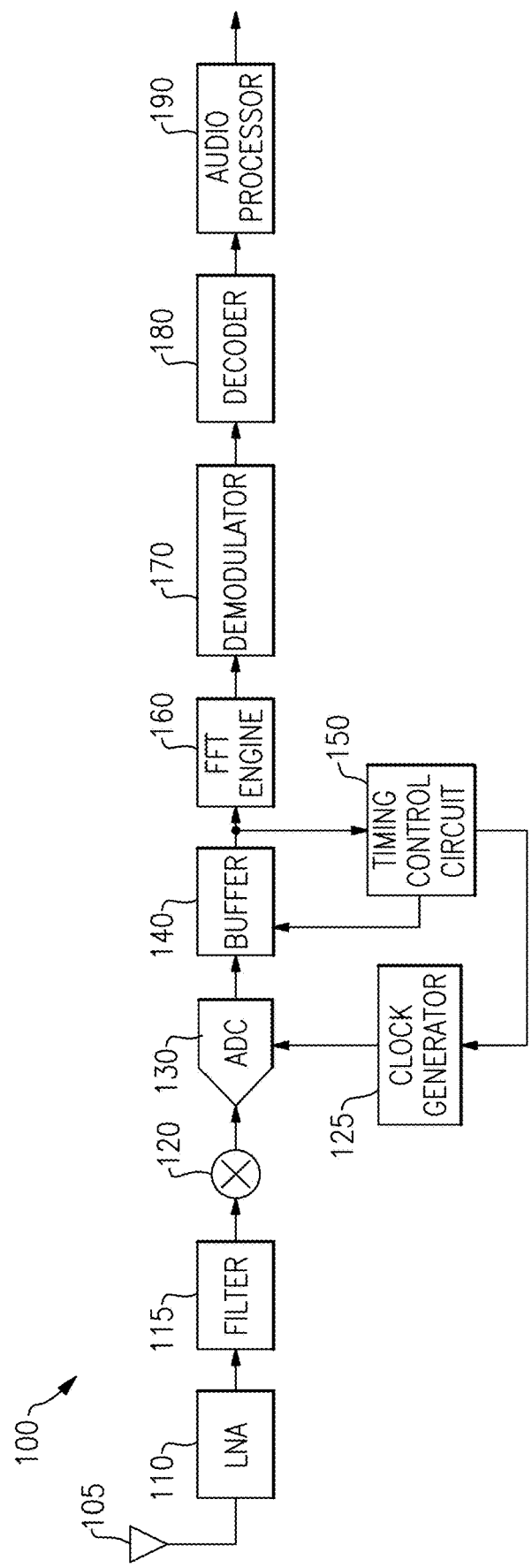

JOINT SAMPLE RATE OFFSET AND SYMBOL TIMING OFFSET CORRECTION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Radio receivers are omnipresent in modern technology. In addition to standalone radios for receipt of broadcast radio signals, all manners of tech and non-tech devices include some type of radio receiver (and often paired with a transmitter). Such modern circuitry is present in any device having wireless capabilities, including vehicle radios, mobile phones, and the like. While some broadcast radio signals are transmitted with analog coding (e.g., conventional AM and FM signals), other terrestrial and satellite wireless communication systems use some type of digital encoding. Some example digital radio systems include National Radio System Committee (NRSC-5C, also known as HD™ radio), Digital Audio Broadcasting (DAB), Digital Radio Mondiale (DRM) or other standard.

Timing estimation is an operation performed in a receiver to synchronize with a transmitter to ensure that incoming signals are correctly received and processed. Such timing estimation is used to ensure that sampling of received information occurs at the correct time so that proper downstream processing can occur. In one example digital radio communication system, message information is communicated in orthogonal frequency division multiplexing (OFDM) symbols. A conventional technique to perform timing estimation in such a system involves performing correlations on received symbols. These correlations require a large number of complex multiplication and other operations, which can incur a significant latency penalty, delaying efficient signal acquisition times and additionally consuming significant computing resources. In addition, conventional correlation techniques suffer performance loss when multi-path channels conditions are present.

SUMMARY

According to some aspects, the techniques described herein relate to a receiver including: a sample rate converter configured to output one or more samples of one or more orthogonal frequency division multiplexing symbols; a fast Fourier transform engine configured to receive the one or more samples and convert each of the one or more samples into a plurality of frequency domain sub-carriers; and a timing control circuit configured to generate a timing error and control the sample rate converter to adjust a sample rate of the one or more orthogonal frequency division multiplexing symbols based at least in part on the timing error.

In some aspects, the techniques described herein relate to a receiver further including a buffer configured to store the one or more samples of one or more orthogonal frequency division multiplexing symbols, the fast Fourier transform engine configured to receive the one or more samples from the buffer.

In some aspects, the techniques described herein relate to a receiver wherein the timing control circuit generates the timing error based at least in part on computations relating to a cyclic prefix of a first one of the one or more orthogonal frequency division multiplexing symbols.

In some aspects, the techniques described herein relate to a receiver wherein the timing control circuit generates the timing error based at least in part on a difference between a first correlation sum for a first portion of a cyclic prefix of a first one of the one or more orthogonal frequency division multiplexing symbols and a second correlation sum for a second portion of the cyclic prefix.

In some aspects, the techniques described herein relate to a receiver wherein the timing control circuit is configured to control the timing to according to a difference between the first correlation sum and the second correlation sum of the one or more orthogonal frequency division multiplexing symbols received via a multi-path channel.

In some aspects, the techniques described herein relate to a receiver wherein the timing control circuit is configured to adjust the timing until the first correlation sum is at least substantially equal to the second correlation sum.

In some aspects, the techniques described herein relate to a receiver wherein the timing control circuit includes a cyclic prefix correlator configured to calculate first cyclic prefix correlations for the first portion of the cyclic prefix and second cyclic prefix correlations for the second portion of the cyclic prefix, and to calculate first guard band correlations for one or more first guard band samples adjacent the first portion of the cyclic prefix and second guard band correlations for one or more second guard band samples adjacent the second portion of the cyclic prefix.

In some aspects, the techniques described herein relate to a receiver further including a summer configured to calculate the first correlation sum based on the first cyclic prefix correlations and the first guard band correlations, and to calculate the second correlation sum based on the second cyclic prefix correlations and the second guard band correlations.

In some aspects, the techniques described herein relate to a receiver wherein the timing control circuit is configured to determine a timing error based on a comparison of the first correlation sum and the second correlation sum.

In some aspects, the techniques described herein relate to a receiver wherein the timing control circuit is further configured to maintain a first count and a second count based on the timing error for a plurality of comparisons of the first correlation sum and the second correlation sum.

In some aspects, the techniques described herein relate to a wireless communication device including: an antenna; transceiver circuitry in communication with the antenna and configured to configured to receive one or more orthogonal divisional multiplexing signals from the antenna, the transceiver circuitry including: a sample rate converter configured to output one or more samples of one or more orthogonal frequency division multiplexing symbols; a fast Fourier transform engine configured to receive the one or more samples and convert each of the one or more samples into a plurality of frequency domain sub-carriers; and a timing control circuit configured to generate a timing error, and control the sample rate converter to adjust a sample rate of the one or more orthogonal frequency division multiplexing symbols based at least in part on the timing error.

In some aspects, the techniques described herein relate to a wireless communication device wherein the transceiver circuitry includes a buffer configured to store the one or more samples of one or more orthogonal frequency division multiplexing symbols, the fast Fourier transform engine configured to receive the one or more samples from the buffer.

In some aspects, the techniques described herein relate to a wireless communication device wherein the timing control circuit generates the timing error based at least in part on computations relating to a cyclic prefix of a first one of the one or more orthogonal frequency division multiplexing symbols.

In some aspects, the techniques described herein relate to a wireless communication device wherein the timing control circuit generates the timing error based at least in part on a difference between a first correlation sum for a first portion of a cyclic prefix of a first one of the one or more orthogonal frequency division multiplexing symbols and a second correlation sum for a second portion of the cyclic prefix.

In some aspects, the techniques described herein relate to a wireless communication device wherein the timing control circuit is configured to control the timing to according to a difference between the first correlation sum and the second correlation sum of the one or more orthogonal frequency division multiplexing symbols received via a multi-path channel.

In some aspects, the techniques described herein relate to a wireless communication device wherein the timing control circuit is configured to adjust the timing until the first correlation sum is at least substantially equal to the second correlation sum.

In some aspects, the techniques described herein relate to a wireless communication device wherein the timing control circuit includes a cyclic prefix correlator configured to calculate first cyclic prefix correlations for the first portion of the cyclic prefix and second cyclic prefix correlations for the second portion of the cyclic prefix, and to calculate first guard band correlations for one or more first guard band samples adjacent the first portion of the cyclic prefix and second guard band correlations for one or more second guard band samples adjacent the second portion of the cyclic prefix.

In some aspects, the techniques described herein relate to a wireless communication device further including a summer configured to calculate the first correlation sum based on the first cyclic prefix correlations and the first guard band correlations, and to calculate the second correlation sum based on the second cyclic prefix correlations and the second guard band correlations.

In some aspects, the techniques described herein relate to a wireless communication device wherein the timing control circuit is configured to determine a timing error based on a comparison of the first correlation sum and the second correlation sum.

In some aspects, the techniques described herein relate to a wireless communication device wherein the timing control circuit is further configured to maintain a first count and a second count based on the timing error for a plurality of comparisons of the first correlation sum and the second correlation sum.

In some aspects, the techniques described herein relate to a method of receiving orthogonal division multiplexing symbols, the method including: receiving, in a receiver, a radio frequency signal; processing, in the receiver, the radio frequency signal to obtain a plurality of orthogonal division multiplexing symbols, each of the plurality of orthogonal division multiplexing symbols including cyclic prefix samples and information samples; determining a timing error based on computations relating to the cyclic prefix samples; controlling a sample rate converter to adjust a sample rate of the plurality of orthogonal division multiplexing symbols based at least in part on the timing error.

In some aspects, the techniques described herein relate to a method wherein controlling a sample rate converter results in jointly correcting for symbol timing offset and sample rate offset.

In some aspects, the techniques described herein relate to a method further including: computing a first correlation sum for correlations of a first portion of the cyclic prefix samples and a guard band portion of the information samples adjacent the first portion of the cyclic prefix samples; computing a second correlation sum for correlations of a second portion of the cyclic prefix samples and a guard band portion of the information samples adjacent the second portion of the cyclic prefix samples; and determining a timing error based at least in part on the first correlation sum and the second correlation sum.

In some aspects, the techniques described herein relate to a method further including determining the timing error based on a comparison of the first correlation sum and the second correlation sum.

In some aspects, the techniques described herein relate to a method further including maintaining a first count and a second count based on the timing error for a plurality of comparisons of the first correlation sum and the second correlation sum.

In some aspects, the techniques described herein relate to a method further including adjusting the timing of the receiver in a first direction when the first count exceeds the second count.

In some aspects, the techniques described herein relate to a receiver including: a clock generator configured to provide a clock signal; an analog to digital converter configured to receive the clock signal, sample an analog receive signal including one or more orthogonal frequency division multiplexing symbols, and output one or more samples of the one or more orthogonal frequency division multiplexing symbols; a fast Fourier transform engine configured to receive the one or more samples and convert each of the one or more samples into a plurality of frequency domain sub-carriers; and a timing control circuit configured to generate a timing error and control the clock generator to adjust a sample rate of the one or more orthogonal frequency division multiplexing symbols based at least in part on the timing error.

In some aspects, the techniques described herein relate to a receiver further including a buffer configured to store the one or more samples of one or more orthogonal frequency division multiplexing symbols, the fast Fourier transform engine configured to receive the one or more samples from the buffer.

In some aspects, the techniques described herein relate to a receiver wherein the timing control circuit generates the timing error based at least in part on computations relating to a cyclic prefix of a first one of the one or more orthogonal frequency division multiplexing symbols.

In some aspects, the techniques described herein relate to a receiver wherein the timing control circuit generates the timing error based at least in part on a difference between a first correlation sum for a first portion of a cyclic prefix of a first one of the one or more orthogonal frequency division multiplexing symbols and a second correlation sum for a second portion of the cyclic prefix.

In some aspects, the techniques described herein relate to a receiver wherein the timing control circuit is configured to control the timing to according to a difference between the first correlation sum and the second correlation sum of the one or more orthogonal frequency division multiplexing symbols received via a multi-path channel.

In some aspects, the techniques described herein relate to a receiver wherein the timing control circuit is configured to adjust the timing until the first correlation sum is at least substantially equal to the second correlation sum.

In some aspects, the techniques described herein relate to a receiver wherein the timing control circuit includes a cyclic prefix correlator configured to calculate first cyclic prefix correlations for the first portion of the cyclic prefix and second cyclic prefix correlations for the second portion of the cyclic prefix, and to calculate first guard band correlations for one or more first guard band samples adjacent the first portion of the cyclic prefix and second guard band correlations for one or more second guard band samples adjacent the second portion of the cyclic prefix.

In some aspects, the techniques described herein relate to a receiver further including a summer configured to calculate the first correlation sum based on the first cyclic prefix correlations and the first guard band correlations, and to calculate the second correlation sum based on the second cyclic prefix correlations and the second guard band correlations.

In some aspects, the techniques described herein relate to a receiver wherein the timing control circuit is configured to determine a timing error based on a comparison of the first correlation sum and the second correlation sum.

In some aspects, the techniques described herein relate to a receiver wherein the timing control circuit is further configured to maintain a first count and a second count based on the timing error for a plurality of comparisons of the first correlation sum and the second correlation sum.

In some aspects, the techniques described herein relate to a wireless communication device including: an antenna; transceiver circuitry in communication with the antenna and configured to configured to receive one or more orthogonal divisional multiplexing signals from the antenna, the transceiver circuitry including: a clock generator configured to provide a clock signal; an analog to digital converter configured to receive the clock signal, sample an analog receive signal representing one or more orthogonal frequency division multiplexing symbols, and output one or more samples of the one or more orthogonal frequency division multiplexing symbols; a fast Fourier transform engine configured to receive the one or more samples and convert each of the one or more samples into a plurality of frequency domain sub-carriers; and a timing control circuit configured to generate a timing error, and control the clock generator to adjust a sample rate of the one or more orthogonal frequency division multiplexing symbols based at least in part on the timing error.

In some aspects, the techniques described herein relate to a wireless communication device wherein the transceiver circuitry includes a buffer configured to store the one or more samples of one or more orthogonal frequency division multiplexing symbols, the fast Fourier transform engine configured to receive the one or more samples from the buffer.

In some aspects, the techniques described herein relate to a wireless communication device wherein the timing control circuit generates the timing error based at least in part on computations relating to a cyclic prefix of a first one of the one or more orthogonal frequency division multiplexing symbols.

In some aspects, the techniques described herein relate to a wireless communication device wherein the timing control circuit generates the timing error based at least in part on a difference between a first correlation sum for a first portion of a cyclic prefix of a first one of the one or more orthogonal frequency division multiplexing symbols and a second correlation sum for a second portion of the cyclic prefix.

In some aspects, the techniques described herein relate to a wireless communication device wherein the timing control circuit is configured to control the timing to according to a difference between the first correlation sum and the second correlation sum of the one or more orthogonal frequency division multiplexing symbols received via a multi-path channel.

In some aspects, the techniques described herein relate to a wireless communication device wherein the timing control circuit is configured to adjust the timing until the first correlation sum is at least substantially equal to the second correlation sum.

In some aspects, the techniques described herein relate to a wireless communication device wherein the timing control circuit includes a cyclic prefix correlator configured to calculate first cyclic prefix correlations for the first portion of the cyclic prefix and second cyclic prefix correlations for the second portion of the cyclic prefix, and to calculate first guard band correlations for one or more first guard band samples adjacent the first portion of the cyclic prefix and second guard band correlations for one or more second guard band samples adjacent the second portion of the cyclic prefix.

In some aspects, the techniques described herein relate to a wireless communication device further including a summer configured to calculate the first correlation sum based on the first cyclic prefix correlations and the first guard band correlations, and to calculate the second correlation sum based on the second cyclic prefix correlations and the second guard band correlations.

In some aspects, the techniques described herein relate to a wireless communication device wherein the timing control circuit is configured to determine a timing error based on a comparison of the first correlation sum and the second correlation sum.

In some aspects, the techniques described herein relate to a wireless communication device wherein the timing control circuit is further configured to maintain a first count and a second count based on the timing error for a plurality of comparisons of the first correlation sum and the second correlation sum.

In some aspects, the techniques described herein relate to a method of receiving orthogonal division multiplexing symbols, the method including: receiving, in a receiver, a radio frequency signal; processing, in the receiver, the radio frequency signal to obtain a plurality of orthogonal division multiplexing symbols, each of the plurality of orthogonal division multiplexing symbols including cyclic prefix samples and information samples; determining a timing error based on computations relating to the cyclic prefix samples; controlling a clock generator to adjust a sample rate of the plurality of orthogonal division multiplexing symbols based at least in part on the timing error.

In some aspects, the techniques described herein relate to a method wherein controlling a clock generator results in jointly correcting for symbol timing offset and sample rate offset.

In some aspects, the techniques described herein relate to a method further including: computing a first correlation sum for correlations of a first portion of the cyclic prefix samples and a guard band portion of the information samples adjacent the first portion of the cyclic prefix samples; computing a second correlation sum for correlations of a second portion of the cyclic prefix samples and a guard band portion of the information samples adjacent the second portion of the cyclic prefix samples; and determining a timing error based at least in part on the first correlation sum and the second correlation sum.

In some aspects, the techniques described herein relate to a method further including determining the timing error based on a comparison of the first correlation sum and the second correlation sum.

In some aspects, the techniques described herein relate to a method further including maintaining a first count and a second count based on the timing error for a plurality of comparisons of the first correlation sum and the second correlation sum.

In some aspects, the techniques described herein relate to a method further including adjusting the timing of the receiver in a first direction when the first count exceeds the second count.

In OFDM systems, sampling impairments can negatively impact signal quality. Such impairments can include carrier frequency offset (CFO), symbol timing offset (STO), and sample rate offset (SRO).

CFO impairment can be the result of multiple factors including doppler spread, variations in local crystal oscillators (LCO) at the transmitter and the receiver, and SRO which, when not corrected can result in inter-carrier inter-reference (ICI) or a reduction of the orthogonality between subcarriers.

While STO can be non-zero without impacting signal performance, it can become detrimental once the magnitude variation of the constellation points results in the degradation of the ability of the decoder to decipher received information. This can result in inter-symbol interference (ISI).

SRO is the result of differing clock rates in the transceiver architecture, which rotate frequency domain components visible as CFO and an increasing STO distance relative to the start of the symbol boundary.

FIG. 1 shows examples of STO, SRO, and CFO sampling impairments on frequency reference cells in DRM frequency reference cell pilots. When such impairments are not detected and corrected, radio system performance can degrade and result in dropped services or lost acquisition.

CFO and the SRO impairment can be jointly estimated as the phase error gradient and constant phase offset relative to known values in the frequency domain using pilots or a preamble sequence as in Chinese Digital Radio or DAB. While this estimation scheme can work well in AWGN channel cases, it can be noisy in fading channels and can often further deteriorate in the presence of doppler spread and frequency selective fading. Such a scheme can involve additional filtering of the output error (the difference between the target and actual value) via a feedback loop. However, such a feedback loop can add further tuning complexity and delay convergence. The multiple closed feedback loops, one for each impairment, of this design can make the system sensitive to large step changes, further limiting the convergence rate.

In OFDM systems with cyclic-prefix (CP) guard intervals, the symbol's CP can be used to estimate the location of the boundary between two adjacent OFDM symbols by maximizing the output correlation, e.g., where the lag is the length of the orthogonal data bearing symbol payload which is forwarded on to the FFT. The difference between the current symbol boundary and the expected symbol boundary can be reduced with a feedback loop, which seeks to minimize this error by moving the read pointer in the direction that minimizes the error distance to remove STO.

Certain CP-correlations can be noisy in the presence of noise and dynamic fading channels and therefore involve another tracking loop to minimize this distance error at the cost of convergence rate and additional filtering.

Techniques described herein, e.g., with respect to FIGS. 1A-6, describe a so called "half-CP" technique which can estimate and correct for STO impairment. For instance, timing estimates resulting from such a technique can be used to move the symbol boundary start pointer location to better minimize the STO error difference.

However, including three different tracking loops all acting in parallel to minimize the associated loop error to correct not only STO, but also CFO and SRO, can make quick convergence difficult in the presence of noise, even with the addition of the half-CP routine, as these loops are now all affected by the change in the parameters of each other.

Systems disclosed herein can employ methods for jointly correcting sample rate offset (SRO) and symbol timing offset (STO) impairments that can degrade OFDM system performance. For example, such methods can use a single offset estimation and tracking scheme, e.g., instead of utilizing separate control loops to compensate for SRO and STO. The system can calculate the estimation point (e.g., in the time domain) using the OFDM cyclic prefix, to track and maintain a lock on the OFDM symbol boundary and reference sample rate. Such techniques can improve performance and reduce complexity as compared to techniques that utilize separate tracking loops or that rely on correlating received symbols.

According to certain embodiments, the method can utilize the half-CP algorithm to jointly compensate for both STO and SRO impairments, as will be described in more detail herein, including with respect to FIGS. 7A-12, for example.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures:

FIG. 2 is a block diagram of a receiver in accordance with an embodiment.

DETAILED DESCRIPTION

Figure 1:
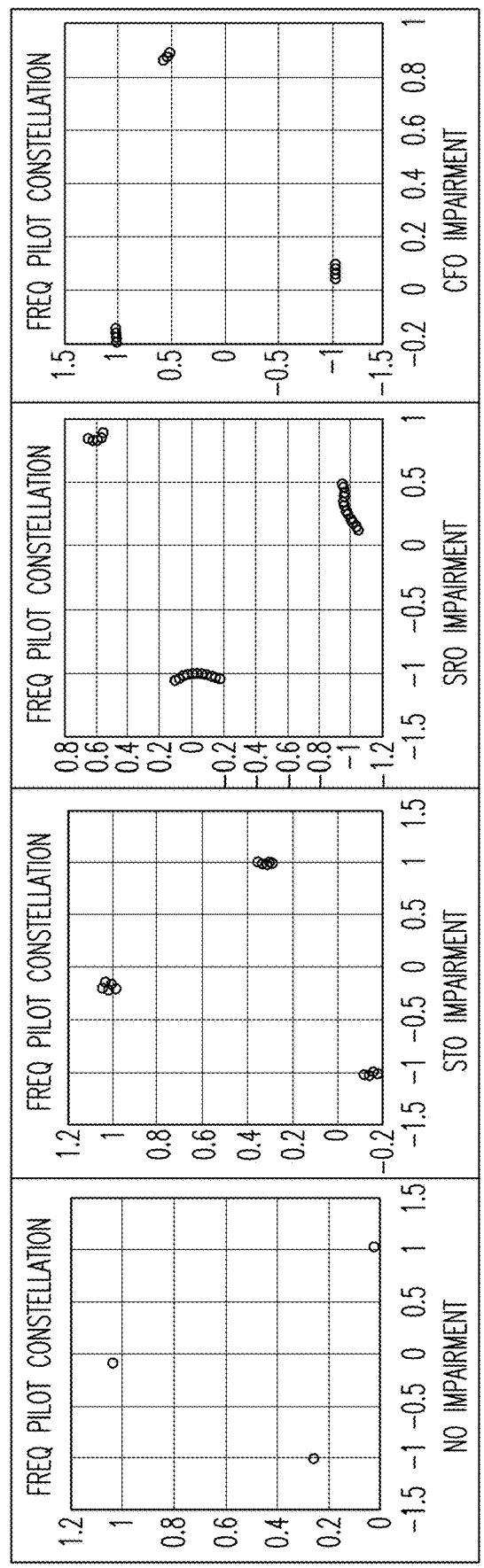
FIG. 1 illustrates various OFDM sampling impairments.

Aspects and embodiments described herein are directed to a radio frequency circuit assembly architecture having a pair of band pass filters arranged in the respective first and second paths of a differentially signaled portion of a power amplifier signal path, between a power amplifier module and an antenna contact for connecting an antenna. This provides improved resistance of the circuit to undesirable frequency components, such as intermodulation distortion including additional frequency components at certain harmonic frequencies. This in turn eliminates or reduces the need for further filtering at the end of the radio frequency circuit assembly architecture signal chain, which has been found to reduce the overall insertion losses in-band for the radio frequency circuit assembly architecture.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

In various embodiments, a radio receiver is implemented with a timing control circuit that is configured to efficiently estimate timing for an incoming radio frequency (RF) signal using minimal information of one or more incoming symbols. Embodiments may be used in a variety of receiver implementations for use in determining the timing estimate for incoming OFDM communications. While embodiments are not limited in this regard, implementations may be used in connection with a Digital Radio Mondiale (DRM) digital radio communication system in accordance with a given DRM specification. Other implementations can be used in connection with other digital communication techniques, including digital TV (e.g., one or more Digital Video Broadcasting (DVB) standards), Integrated Digital Services Broadcasting (IDSB), cellular techniques such as Long Term Extension (LTE) and 5G, or other receivers using OFDM signaling.

While a timing control circuit can be implemented in different manners, in embodiments herein this circuit may be implemented as a feedback circuit that receives downconverted digitized symbols in the time domain (prior to these symbols being converted to the frequency domain for further processing including decoding and demodulation). Further, in different implementations this feedback circuit may control one or more components of the receiver to adjust timing. Regardless of the mechanism of timing control, as a result of adjusting the timing, a next OFDM symbol will be sampled from a different point in time.

Figure 1A:
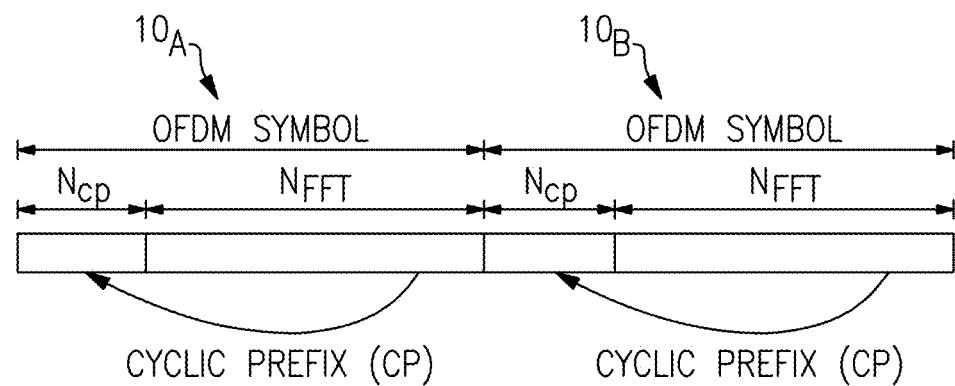
FIG. 1A is a diagram illustrating example OFDM symbols.

Referring now to FIG. 1A, shown is a diagram illustrating example OFDM symbols. Specifically in FIG. 1A, OFDM symbols 10 A, 10 B are illustrated. Each symbol 10 is formed of a cyclic prefix (CP) having a plurality of samples and a data portion having a larger set of samples that includes the samples of the cyclic prefix and additional samples. As such, each OFDM symbol 10 has $N_{CP}+N_{FFT}$ samples (complex valued). Note that the number of cyclic prefix samples and FFT samples can vary in different systems. For example in DRM there are multiple options for $N_{FFT}$ and $N_{CP}$, including: $[N_{FFT}, N_{CP},]=>[576; 64]$; [288, 32]; [144, 16]; [512, 128]; [256, 64]; [128, 32] as a subset of DRM techniques, more generically $[N_{FFT}, N_{CP},]$.

The value of the sample at location i may be defined as $X_i$. Accordingly, then according to a CP definition:

$$X_i + N_{i+N_{FFT}} \text{ for } 0 \leq i \leq N_{cp} \qquad \text{[Equation 1]}.$$

To ensure good synchronization between a transmitter and a receiver, the receiver may perform one of various techniques to identify timing. In many receivers, a conventional technique for identifying a beginning of a cyclic prefix of an OFDM symbol is performed based on correlation processing. As one particular example, this correlation technique may determine a cyclic prefix correlation for a length of summation No). Note that the k value is calculated for [0; $N_{FFT}+N_{CP}-1$], according to:

$$\theta_k = \sum_{i=0}^{N_{cp}-1} X_{i+k} * X^*_{i+k+N_{FFT}}. \qquad \text{[Equation 2]}$$

From this correlation, the CP can be identified by finding a $\max(|\theta_k|)$ for $0 \leq k < N_{FFT}$.

Figure 1B:
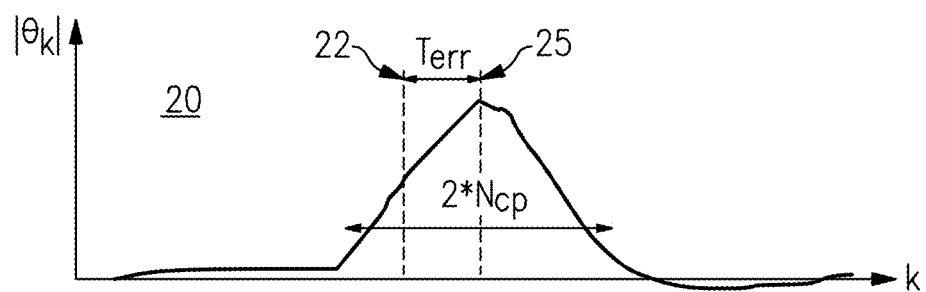
FIG. 1B is a graphical illustration of a relationship between a correlation value and a given sample within a symbol.

Referring now to FIG. 1B, shown is a graphical illustration of a relationship between a correlation value (y-axis) and a given sample k (x-axis) within a symbol. As shown, illustration 20 describes a timing correction between a predicted peak position at a point 22, while in fact an actual peak position is at a point 25. As such, an expected peak is at point 22 and calculated OFDM symbol start is according to point 22. Accordingly, a timing loop is to be corrected so that the next predicted value will be closer to the measured position of the peak. As such, a timing correction may be a function of this timing error, f(Terr). While this correlation technique may work well in some situations, difficulties arise when a received signal passes through a multi-path channel. In this instance, a peak is not so definite, and this peak may jump some number of $N_\tau$ symbols corresponding to a multi-path delay. Further, the timing error measurement can be very jumpy. Therefore, a timing loop using this timing error may require a very long term averaging, making it very slow.

Thus while a CP correlation technique may work well with very short multi-path situations, it may face difficult challenges when the multi-path is long. One particular situation that creates a problem is when the multi-path has two equal paths with a significant delay between them.

Another issue with a conventional technique is the complexity involved in calculating the correlations. Specifically, there are $N_{CP}$ complex multiplications per $\theta_k$. Thus for a complete OFDM symbol, this technique incurs a total of $N_{CP}*(N_{CP}+N_{FFT})$ complex multiplications and $N_{CP}+N_{FFT}-1$ comparisons.

Instead with embodiments, a more efficient manner of identifying a beginning of an OFDM symbol can be used to implement a timing estimate. More specifically, rather than performing a correlation across an entire OFDM symbol, only samples inside a cyclic prefix (and some small number of guard band samples adjacent to the cyclic prefix) may be used.

Figure 1C:
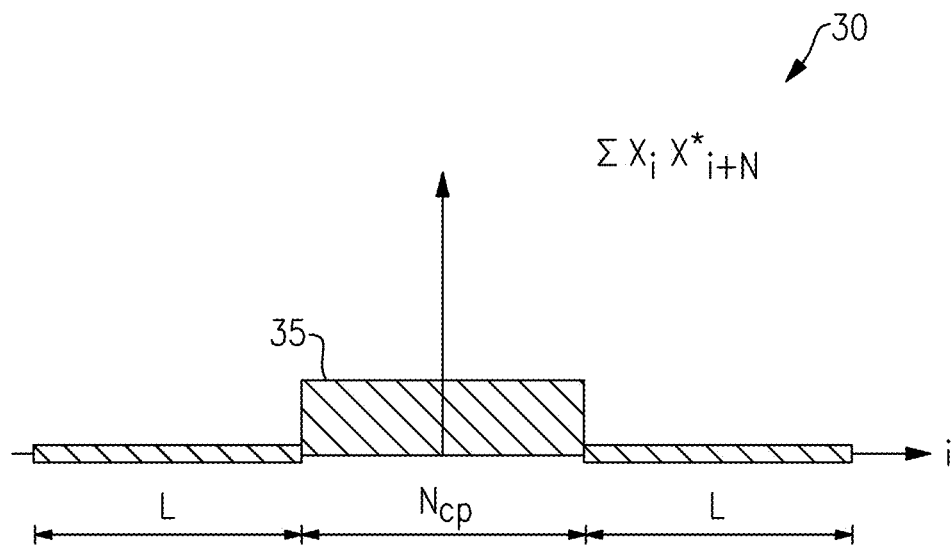
FIG. 1C is a block diagram illustrating a statistical expected value of a correlation performed in accordance with an embodiment.

Referring now to FIG. 1C, shown is a block diagram illustrating a statistical expected value of the $X_i X^*_{i+N}$ (correlation herein) depending on the position i in the OFDM symbol. As shown in FIG. 1C, a graphical illustration 30 includes an expected value 35 of correlation, which will be equal to an energy of the signal plus noise within the cyclic prefix and energy of the noise only outside the cyclic prefix. As seen, these values are much greater than the minimal correlation values for guard band samples L on either side of the guard band. Note that his guard band value L corresponds to an uncertainty of time with respect to the cyclic prefix. In embodiments, L may be set between approximately 8 and 16 for a DRM system in which a CP includes 32 symbols. In general L may be set large enough in case the actual timing changes too fast or the expected operating conditions are very noisy. If in actual operation, actual timing is slower or the SNR conditions better than anticipated, the value of L may be reduced.

In an embodiment, a minimal number of correlations may be performed and summed according to Equations 3 and 4. As shown, two correlation sums are determined, each for a portion of a CP and some number of adjacent samples.

$$\theta_{left} = \sum_{i=-L}^{\frac{N_{cp}}{2}-1} X_i X^*_{i+N_{FFT}} \qquad \text{[Equation 3]}$$

$$\theta_{right} = \sum_{i=\frac{N_{cp}}{2}}^{N_{cp}+L-1} X_i X^*_{i+N_{FFT}} \qquad \text{[Equation 4]}$$

A resulting timing error may be determined in accordance with Equation 5. As shown, this timing error may be determined based on a difference between absolute values of the two correlation sums. And a timing correction is a function of this timing error.

$$\text{Terr}=|\theta_{right}|-|\theta_{left}| \qquad \text{[Equation 5]}$$

Figure 1D:
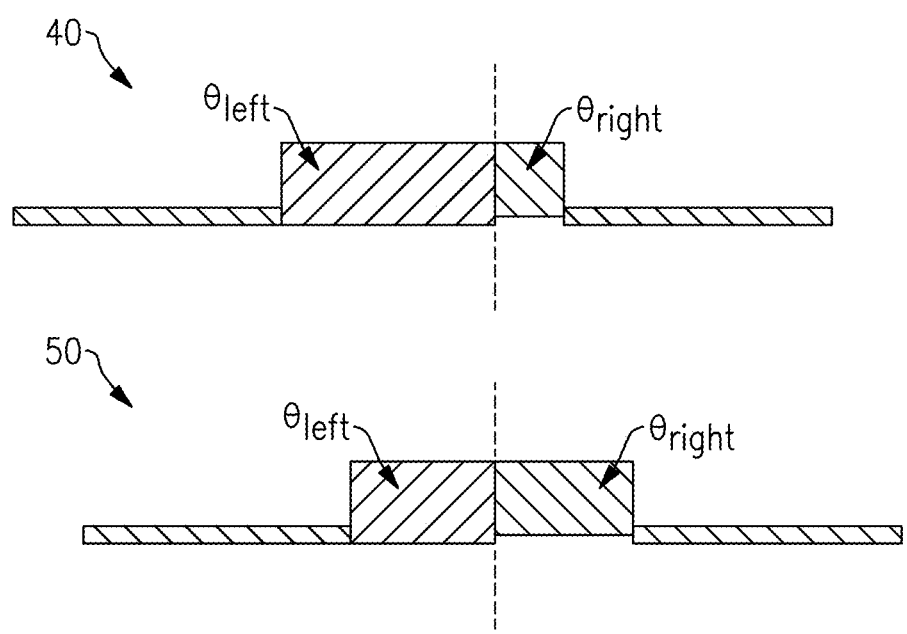
FIG. 1D shows graphical illustrations of exemplary correlation sums in accordance with an embodiment.

FIG. 1D shows graphical illustrations 40 and 50 of exemplary correlation sums. As illustrated in FIG. 1D, in the instance where the left side correlation sum ($\theta_{left}$) exceeds the right side correlation sum ($\theta_{right}$), the area on the left side is larger than the area on the right side. As such, a timing control circuit in accordance with an embodiment may be configured to correct timing until the areas on each side are at least substantially equal.

With an embodiment herein, these two correlation sums are calculated, instead of needing to determine such sums for the full number of samples of a CP (or an entire symbol). And further note that this error determination, which is a measure of a difference in energy between the two correlation sums, does not have issues with regard to trying to determine a peak in correlation values, such as described above with regard to FIG. 1B, which can be very difficult in instances of a multi-path channel, as described below.

Figure 1E:
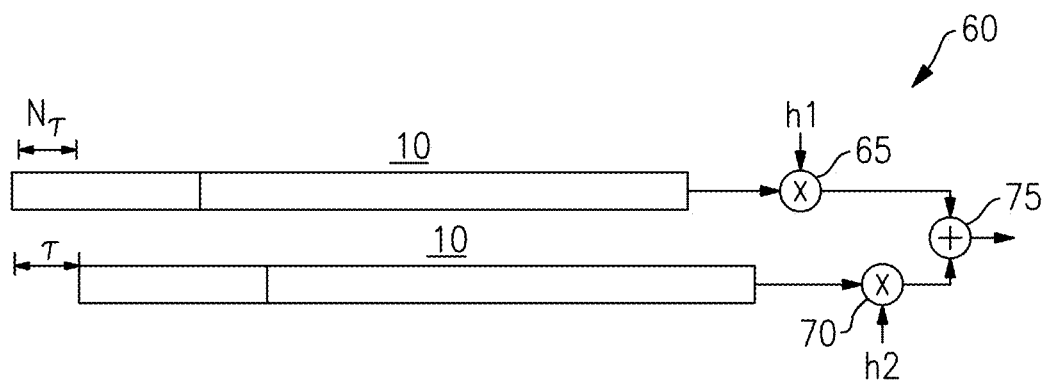
FIG. 1E is an illustration of symbol reception in a multi-path channel.
Figure 1F:
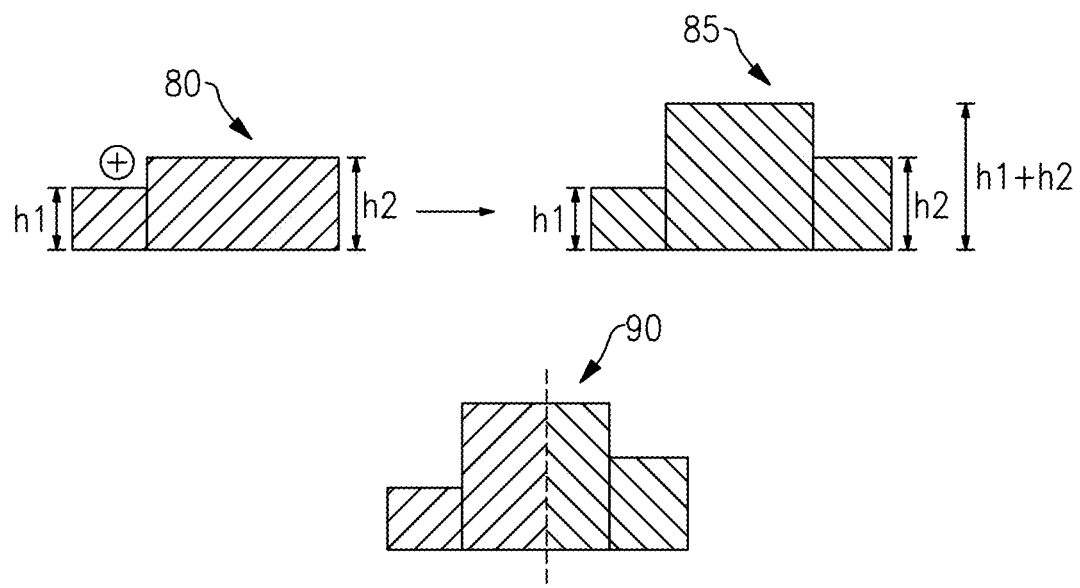
FIG. 1F is an illustration of a tracking estimate result in accordance with an embodiment.

When an OFDM signal passes through a multi-path channel, there are delays inherent between the two channels. As shown in FIG. 1E, a signal contribution from a first channel h1 and a second channel h2 results in a combined signal with different correlation values. Specifically, a symbol 10 received via two channels (represented by multiply operations 65, 70) results in a summed symbol (represented at an output of summer 75). With embodiments however, timing estimation may be performed such that the correlation sums substantially equal each other, as the algorithm of Equations 3-5 converges to a center of mass of the multi-path channel. That is, as shown in FIG. 1F, resulting correlation sums 80 and 85 representing correlation sums from the multiple channels (80 and 85), result in a center of mass 90 of the multi-path channel.

In embodiments herein, a reduced number of correlations may be computed. Here, a total of ($N_{CP}+2L$) complex multiplications may be performed. Still further with embodiments, this technique provides better performance than a conventional correlation technique in the face of long multi-path channels. More specifically, with embodiments herein, the computation complexity is ($N_{CP}+2L$) vs $N_{CP}*(N_{CP}+N_{FFT})$ where $2L<N_{FFT}$. In this way, the complexity is at least $N_{CP}$ times smaller.

Referring now to FIG. 2, shown is a block diagram of a receiver in accordance with an embodiment. As shown in FIG. 2, receiver 100 may include a signal processing path having various components. Embodiments can be incorporated in different types of receiver systems. In some embodiments, receiver 100 may be a single-die integrated circuit such as a CMOS die having mixed signal circuitry including both analog and digital circuitry.

With reference to receiver 100, an incoming RF signal that includes digital radio signals according to a given digital broadcast specification may be received over the air via an antenna 105. As used herein, the terms "digital radio" or "digital radio broadcast signal" are used interchangeably and are intended to correspond to broadcast radio communication that occurs digitally. Such communications may be in accordance with various standards such as a HD™ radio, DAB, DRM or other standard.

As shown in FIG. 2, an incoming radio frequency (RF) signal received via antenna 105 is provided to a low noise amplifier (LNA) 110, which amplifies the RF signal. In turn, LNA 110 is coupled to a filter 115, which may perform filtering of the received RF signal. Understand while shown with two RF front end blocks, a receiver may include additional RF front end circuitry in other examples. In turn, the filtered RF signal is provided to a mixer 120, which in an embodiment may be implemented as a complex mixer. In embodiments herein mixer 120 may downconvert the RF signal to a lower frequency signal using a mixing signal (not shown in FIG. 2). In a particular embodiment, this lower frequency signal may be, e.g., a low-intermediate frequency (IF) or zero-IF signal. This downconverted signal is an in-phase/quadrature phase (IQ) signal.

The resulting downconverted signal is provided to an analog-to-digital converter (ADC) 130, where the signal can be digitized into a digital signal at a sampling rate according to a clock signal received from a clock generator 125. In an embodiment, clock generator 125 may be implemented as a local oscillator, phase lock loop or other such clock generation circuit. In an embodiment in which the sampling clock signal and mixing signal are at the same frequency, clock generator 125 also may provide the mixing signal to mixer 120. Note that in some embodiments, either before or after digitization, channelization may be performed to generate a channelized signal. In an OFDM system, a plurality of samples forms an OFDM symbol of an incoming data stream.

In turn, samples are provided to a buffer 140, which may be implemented as a first in first out (FIFO) 140. The incoming samples are stored in buffer 140 and are then output to a main digital signal processing path including a fast Fourier transform (FFT) engine 160, which generates frequency domain OFDM symbols from incoming time domain OFDM symbols. In one embodiment, each incoming time domain OFDM symbol can be processed by FFT engine 160 into a plurality of sub-carriers. Note that the number of sub-carriers corresponding to a given OFDM symbol may vary depending upon bandwidth of signal and a time duration of the OFDM symbol (without a cyclic prefix).

As further shown in FIG. 2, the incoming time domain OFDM symbols stored in buffer 140 also may be provided to a timing control circuit 150. In embodiments herein, timing control circuit 150 may be configured to perform timing estimation to determine a synchronization of the OFDM symbols. In this way, the symbols can be provided to downstream digital processing circuitry in correct synchronization. While embodiments may vary, in examples herein, timing control circuit 150 may determine a timing estimate and provide control signals to buffer 140 and/or clock generator 125 to control timing. As such, timing control circuit 150 acts as a feedback circuit to control timing based on the OFDM symbols themselves. More specifically as described herein, only a portion of an OFDM symbol, namely a CP and a limited guard band around this CP, is used to estimate timing.

The sub-carrier outputs from FFT engine 160 form a frequency domain symbol that in turn is provided to a demodulator 170, which may demodulate the incoming sub-carriers and provide demodulated sub-carriers. In an embodiment, demodulator 170 may be a sub-symbol decoder to produce soft information (e.g., 1 bit per carrier in 2 PAM, 2 bits per carrier in QPSK, 4QAM, etc.) per sub-carrier. In turn, the demodulated sub-carriers may be provided to a decoder 180, where error correction and information bit extraction is performed. In turn, the resulting demodulated signal may be provided to an audio processor 190 for audio processing. The encoded audio signal is then provided to an audio source decoder (not shown for ease of illustration in FIG. 2) to generate source audio. In the case of a data link, information bits may be provided to a data processor. Although shown as individual components, understand that portions of the receiver after ADC 130 to the end of the signal processing path of FIG. 2 can be implemented in a digital signal processor (DSP).

While described with this particular embodiment in FIG. 2, other implementations are possible, and additional circuitry can be present. For example, in some embodiments, additional circuitry including a deinterleaver, depuncturer, and a forward error correction (FEC) decoder may be present, to strip parity bits and provide the information bits. In addition, a timing control circuit may be configured in other types of hardware, may be realized via combinations of hardware, firmware, and/or software, and also may be implemented within a microcontroller or DSP.

Figure 3:
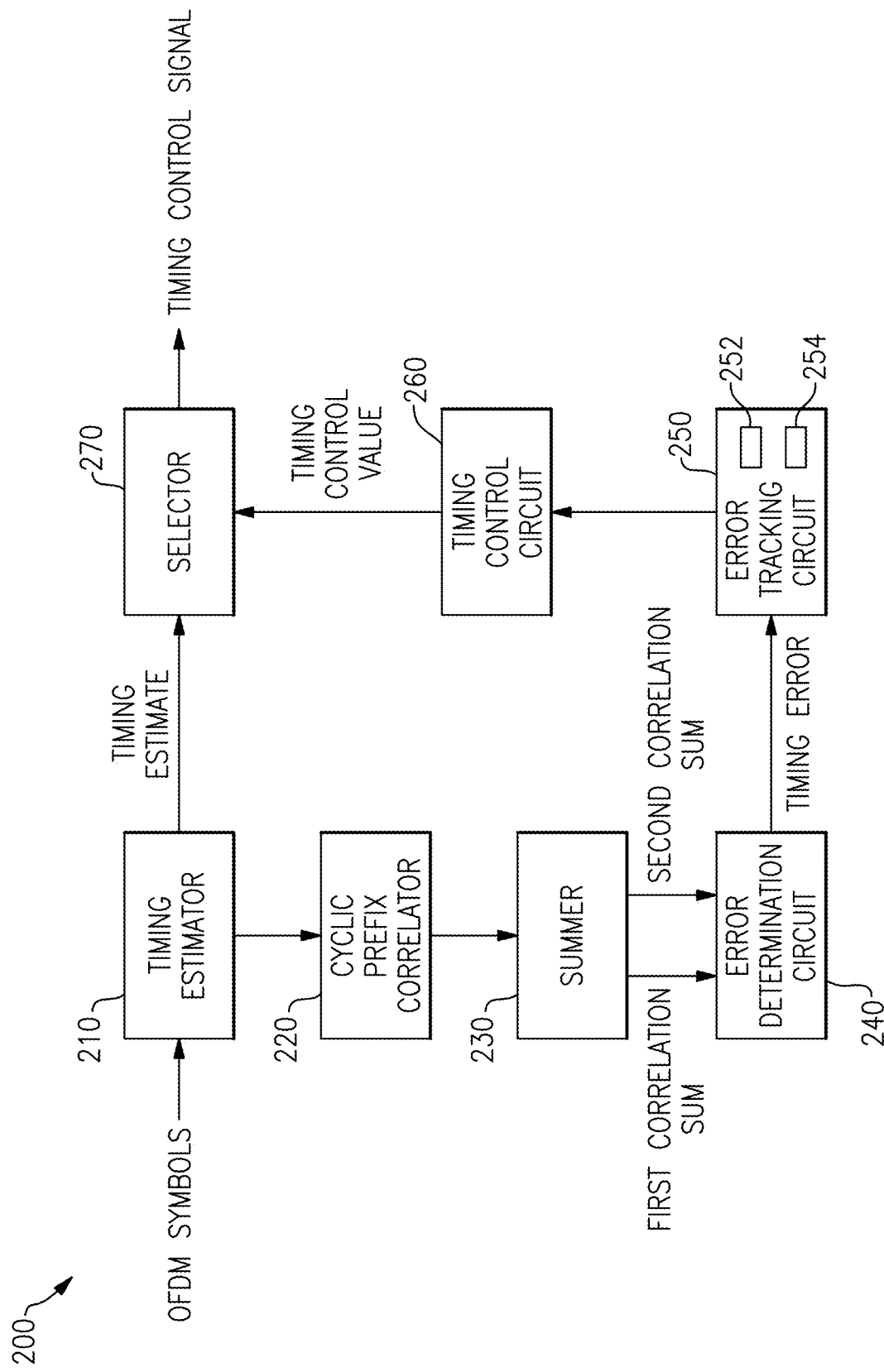
FIG. 3 is a block diagram of a timing control circuit in accordance with an embodiment.

Referring now to FIG. 3, shown is a block diagram of a timing control circuit in accordance with an embodiment. As shown in FIG. 3, a timing control circuit 200 receives incoming OFDM symbols. In one embodiment, timing control circuit 200 may receive incoming time domain OFDM samples of one or more OFDM symbols from a buffer. More specifically, the received symbols are provided to a timing estimator 210. Timing estimator 210 may generate a timing estimate based on one or more of the OFDM symbols. Although embodiments are not limited in this regard, a conventional correlation technique may be used to generate this timing estimate.

This timing estimate is thus an initial timing estimate that is used to provide coarse identification of the beginning of one or more of the symbols. As shown, this timing estimate is provided to a selector 270, which in an embodiment may be implemented as a multiplexer or other selection circuit. Before a timing estimate in accordance with an embodiment is determined, selector 270 may be configured to provide this received timing estimate as a timing control signal. This timing control signal may be used to control receiver circuitry, such as buffer circuitry to control output from the buffer. In this or another implementation, the timing control signal also may be provided to a clock generator, which may control a sampling clock of an ADC to control sampling rate based on the determined OFDM timing estimate.

Still with reference to FIG. 3, the received OFDM symbols are further provided from timing estimator 210 to a cyclic prefix correlator 220. In embodiments herein, cyclic prefix correlator 220 may generate correlations for samples of a cyclic prefix of the OFDM symbols, along with some number of samples adjacent to the cyclic prefix. With embodiments herein, the timing estimate determined in timing estimator 210 may be used to indicate an approximate or estimated location of the cyclic prefix. In turn, correlation values for the CP and guard band samples adjacent to the CP are provided to a summer 230. In embodiments herein, summer 230 may be configured to generate two separate sums, namely a first correlation sum and a second correlation sum. In an embodiment, the first correlation sum is determined for a first portion of the CP and guard band samples adjacent this first portion of the CP, and the second correlation sum is determined for a second portion of the CP and guard band samples adjacent this second portion of the CP.

Still with reference to FIG. 3, these correlation sums are provided to an error determination circuit 240, which may determine a timing error based on these two correlation sums. In turn, this timing error is provided to an error tracking circuit 250. In embodiments herein, error tracking circuit 250 may be configured to maintain two counts, e.g., in a first counter 252 and a second counter 254. This first count may correspond to instances of the timing error in which an absolute value of the first correlation sum exceeds an absolute value of the second correlation sum and in turn, the second count may correspond to instances of the timing error in which an absolute value of the second correlation sum exceeds an absolute value of the first correlation sum.

These counts may be provided to a timing control circuit 260. In embodiments herein, timing control circuit 260 may be configured to determine whether to adjust timing in a given direction, based at least in part on these first and second counts. In turn, timing control circuit 260 outputs a timing control value that corresponds to a measure of a timing estimate. When this signal is available, selector 270 may be configured to provide this timing control value as the timing control signal, instead of the initial timing estimate. Understand while shown at this high level in the embodiment of FIG. 3, many variations and alternatives are possible.

Figure 4:
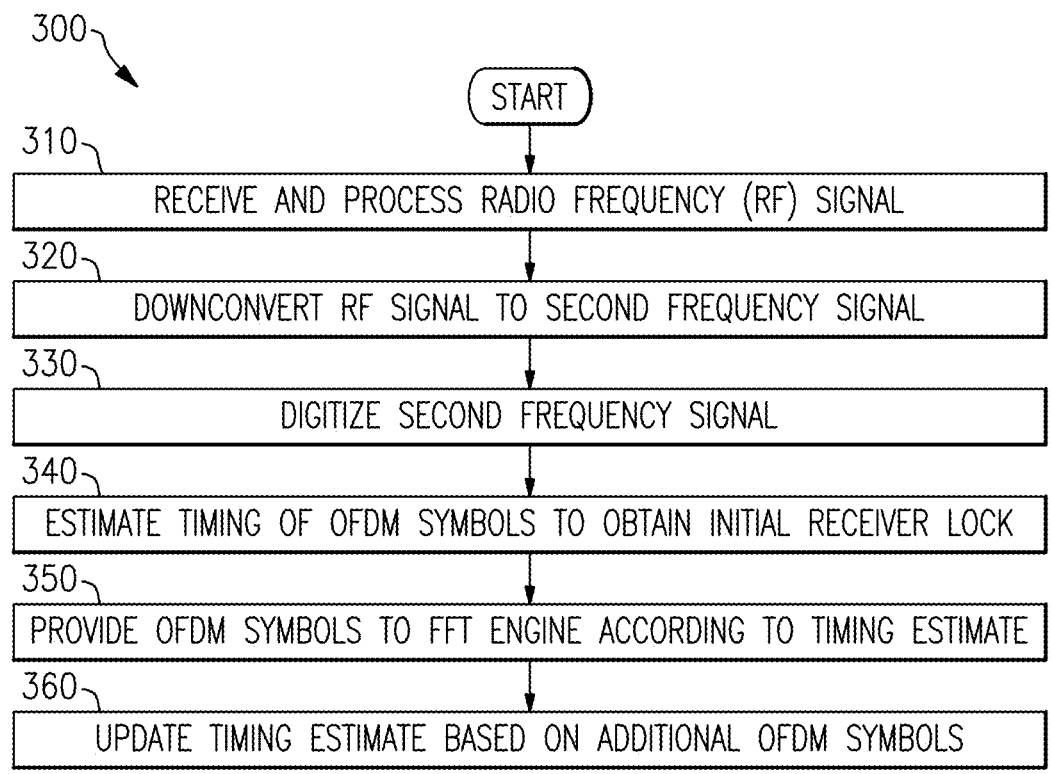
FIG. 4 is a flow diagram of a method in accordance with an embodiment.

Referring now to FIG. 4, shown is a flow diagram of a method in accordance with an embodiment. More specifically as shown in FIG. 4, method 300 is a high level method of generating a timing estimate in accordance with an embodiment. As such, method 300 may be performed by various hardware circuitry such as may be present in a receiver, e.g. receiver 100 of FIG. 2, along with firmware and/or software, in some implementations.

As illustrated, method 300 begins by receiving and processing an RF signal (block 310). This RF signal may be received via an antenna and provided to a signal processing path of the receiver where it can be processed, e.g., by way of amplification or other gain control, filtering, channelization or so forth. Next at block 320 the RF signal may be downconverted to a second, lower frequency signal. As an example, this second frequency signal can be at a low IF or zero IF level. Then at block 330 this second frequency signal is digitized, e.g., in an ADC. Note that additional operations may be performed on this digital signal, including various signal processing, time-to-frequency conversion and so forth to recover the message content and provided it to a destination such as an audio output device.

Still referring to FIG. 4, next at block 340 a timing of the OFDM symbols may be estimated. More specifically here, an initial receiver lock may be obtained from one or more OFDM symbols. As one example, a conventional correlation technique can be performed to determine this initial timing estimate. Note that this conventional technique requires a large number of correlations to be calculated as discussed above.

Still with reference to FIG. 4, in turn at block 350, these OFDM symbols may be provided to an FFT engine according to the timing estimate, where they may be converted from the time domain to the frequency domain as a plurality of sub-carriers. Note that with this initial timing estimate, a symbol beginning may not exactly correspond with the true beginning of the symbol, leading to undesired noise and performance loss.

Thus as illustrated, the initial timing estimate may be updated at block 360. More specifically, as additional OFDM symbols are received, a timing estimate may be updated using techniques in accordance with an embodiment. In this way, a minimal amount of CP correlations can be calculated and used to determine a timing error based on two correlation sums as described. Thus receiver timing may be updated and maintained with lesser complexity and more speed.

Figure 5:
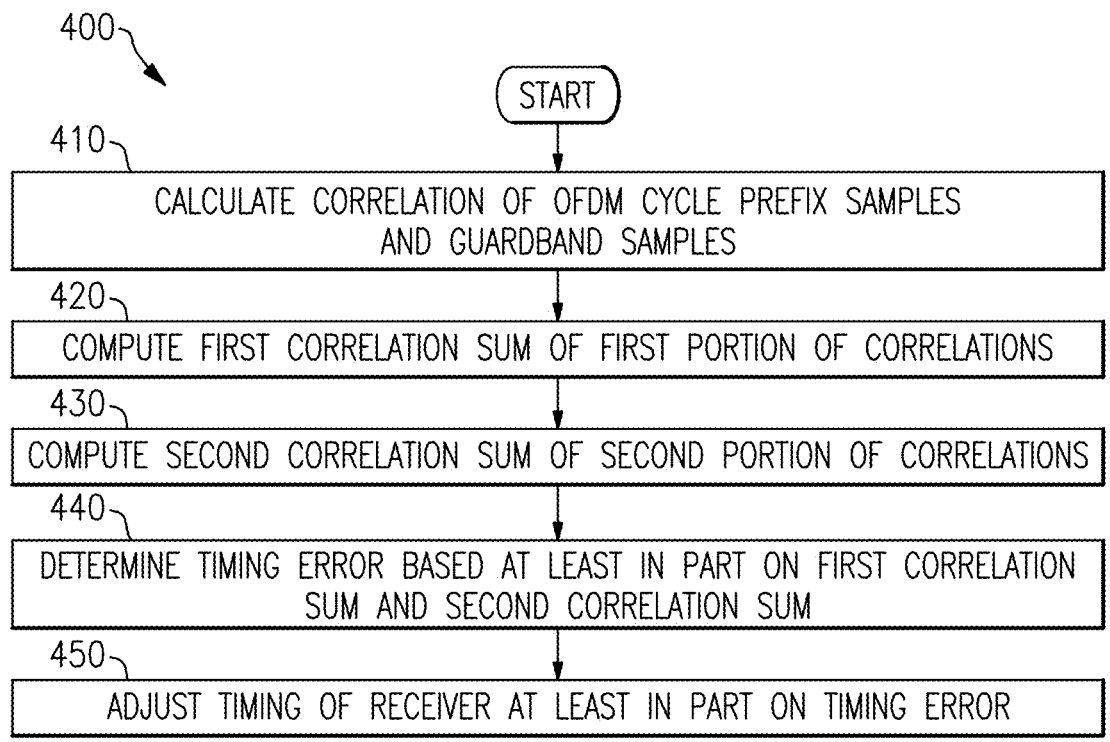
FIG. 5 is a flow diagram of a method in accordance with another embodiment.

Referring now to FIG. 5, shown is a flow diagram of a method in accordance with another embodiment. More specifically, method 400 is a method for determining a timing estimate using techniques accordance with an embodiment. As such, method 400 may be performed by various hardware circuitry of a receiver such as a timing control circuit, along with firmware and/or software, in some implementations.

Method 400 begins by calculating a correlation of CP samples and guard band samples of a given OFDM symbol (block 410). From these correlations, a first correlation sum can be computed for a first portion of an OFDM symbol (block 420). This first portion may correspond to the correlations for a right side portion of the CP, along with some number of guard band samples adjacent to this right side portion.

Next at block 430, a second correlation sum can be computed for a second portion of the OFDM symbol. This second portion may correspond to the correlations for a left side portion of the CP, along with some number of guard band samples adjacent to this left side portion.

Still with reference to FIG. 5, control next passes to block 440, where a timing error may be determined. More specifically, this timing error may be determined based at least in part on the first correlation sum and the second correlation sum. Finally, at block 450 a timing of the receiver may be adjusted based at least in part on this timing error. As one example, in response to the timing error, timing of the receiver may be adjusted. For example, a read pointer for a buffer that stores OFDM samples can be adjusted in a given direction based on this timing error. Or in other cases, a sampling clock for an ADC can have its frequency adjusted in response to this timing error.

In yet other implementations, a combination of these techniques or another control technique may be used. For example, a sample rate converter may be implemented in the receive chain before the timing loop having an adjustable rate according to the timing error, which may be equivalent to adjusting the sampling clock of the ADC. In yet other embodiments, a combination of read pointer adjustment for a buffer that stores OFDM samples and sampling clock rate adjustment can be used.

Note that in other embodiments, instead of adjusting timing based on a determination of a single timing error, the operations described in blocks 410-440 may be performed multiple times, and an averaging or other smoothing process can be used to adjust timing after a number of different timing error samples have been determined. Understand while shown at this high level in the embodiment of FIG. 5, many variations and alternatives are possible.

Figure 6:
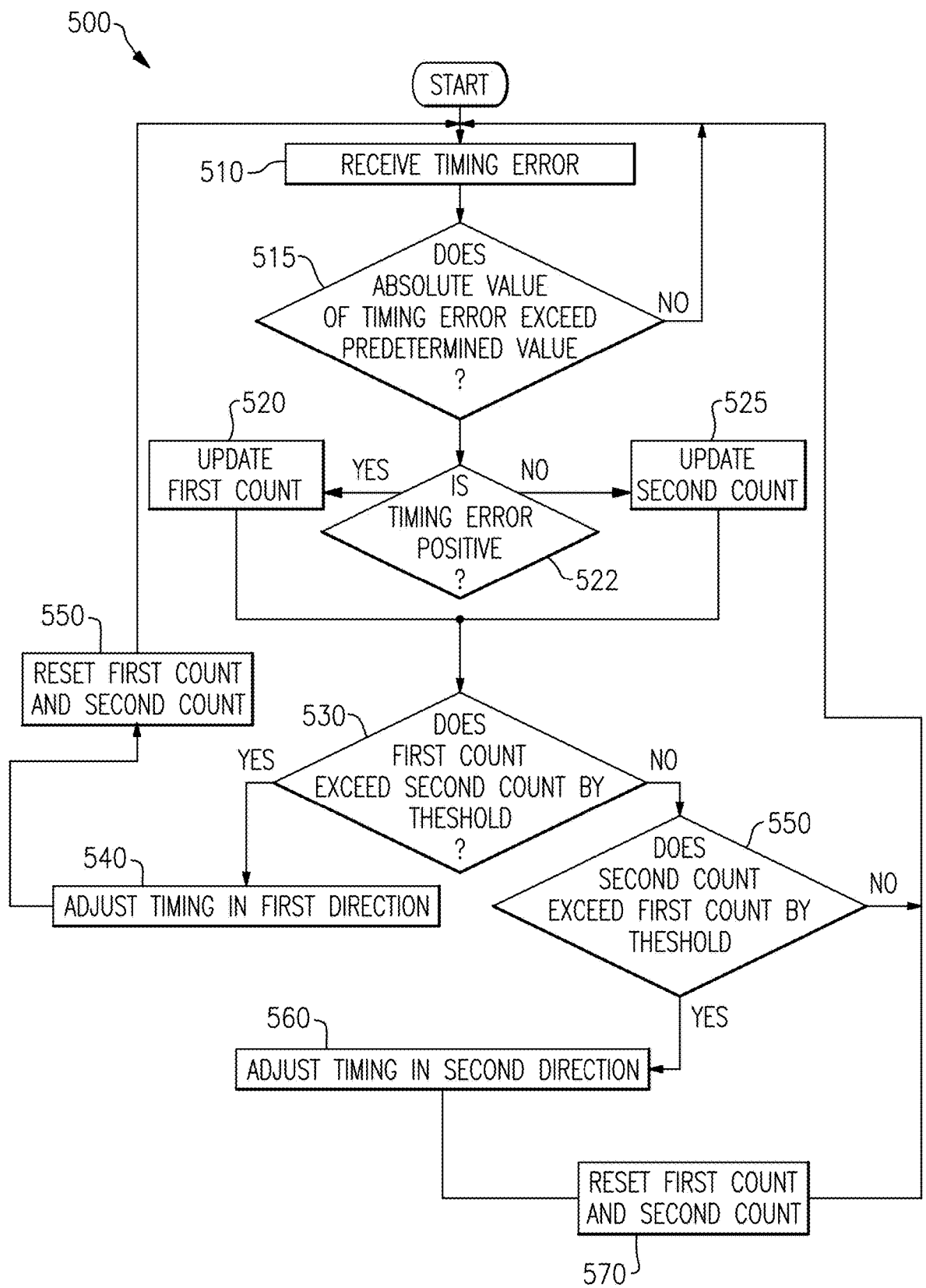
FIG. 6 is a flow diagram of a method in accordance with another embodiment.

Referring now to FIG. 6, shown is a flow diagram of a method in accordance with another embodiment. As such, method 500 may be performed by various hardware circuitry such as a timing control circuit, e.g. circuit 200 of FIG. 3, along with firmware and/or software, in some implementations. As shown, method 500 begins by receiving a timing error (block 510). This timing error may be received within circuitry of a timing control circuit. For example, with reference back to FIG. 3, this timing error may be received in error tracking circuit 250. Next it is determined at diamond 515 whether an absolute value of the timing error exceeds a predetermined value. In one embodiment, this predetermined value may be set to a given threshold level. If the absolute value exceeds this predetermined value, control passes to diamond 522, where it is determined whether the timing error is positive, meaning that the difference between a first correlation sum (for the right side portion of a CP and some adjacent samples) exceeds a second correlation sum (for the left side portion of the CP and some adjacent samples). If so, control passes to block 520 where a first count may be updated. Otherwise, control passes to block 525 where a second count may be updated.

As such, the first count provides a positive difference in which the first correlation sum exceeds the second correlation sum. In turn, the second count is a count of negative differences, namely where the second correlation sum exceeds the first correlation sum. Stated another way, these counts are updated based on a sign of the timing error.

Still with reference to FIG. 6, control next passes to diamond 530 to determine whether this first count exceeds the second count by a threshold amount. Note that this threshold amount can be set to different levels in different implementations. For example, in one embodiment the threshold may be set between approximately 50 and 200, such that a measure of hysteresis is provided. In this way, timing does not change on an interval of one or a small number of OFDM symbols. If it is determined that the first count exceeds the second count by this threshold level, control passes to block 540 where timing may be adjusted in a first direction. Continuing with the present example, this first direction is to move the timing later. Thereafter, control passes to block 550 where the first and second counts may be reset. As a result, some number of timing errors may be determined and updates to the counts occur prior to any further adjustment to timing.

Still with reference to FIG. 6, instead if the first count does not exceed the second count by the threshold amount, control passes from diamond 530 to diamond 550. Here it is determined whether the second count exceeds the first count by a threshold level. Note that this threshold level may be the same as in diamond 530, or it can be a different value. If it is determined that the second count exceeds the first count by this threshold amount, control passes to block 560 where timing may be adjusted in a second direction. Continuing with the present example, this second direction is to move the timing earlier. Then at block 570, the first and second counts may be reset, as described above.

In another example, a time delay can be updated, and based upon the time delay value, the timing loop may be adjusted and the time delay can be reset. For example:

time_delay=time_delay+alpha*sign(time_error).

If the time_delay>1 or time_delay<1, adjust the timing loop and reset time_delay to zero. In this implementation, alpha could be 0.01, for example, meaning that a minimum of 100 time errors measurements are done to get to a time_delay>1 or time_delay<−1.

In yet another case, the above operation can instead be as follows:

time_delay=time_delay+alpha*time_error;

If the time_delay>1 or time_delay<1, adjust the timing loop and reset time_delay to zero.

Joint SRO and STO Tracking and Correction

Certain impairment estimation techniques described herein can utilize the half-CP correlation scheme described, e.g., with respect to FIGS. 1A-6 to compare the power in the left half and the right half of a tracking time buffer and accumulate the number of times the correlation is larger in left half or right half, respectively.

Systems and methods according to certain embodiments, including those described with respect to FIGS. 7A-13, for example, track SRO and STO jointly. For instance, such systems can use the half-CP timing impairment estimation in a tracking loop where the difference between the total count of left vs right half is fed into a control loop. The control loop can change the system sample rate to jointly track SRO and STO, as opposed to, for example, moving the buffer read pointer directly via sample incrementation and adjusting SRO using a separate control loop.

Figure 7A:
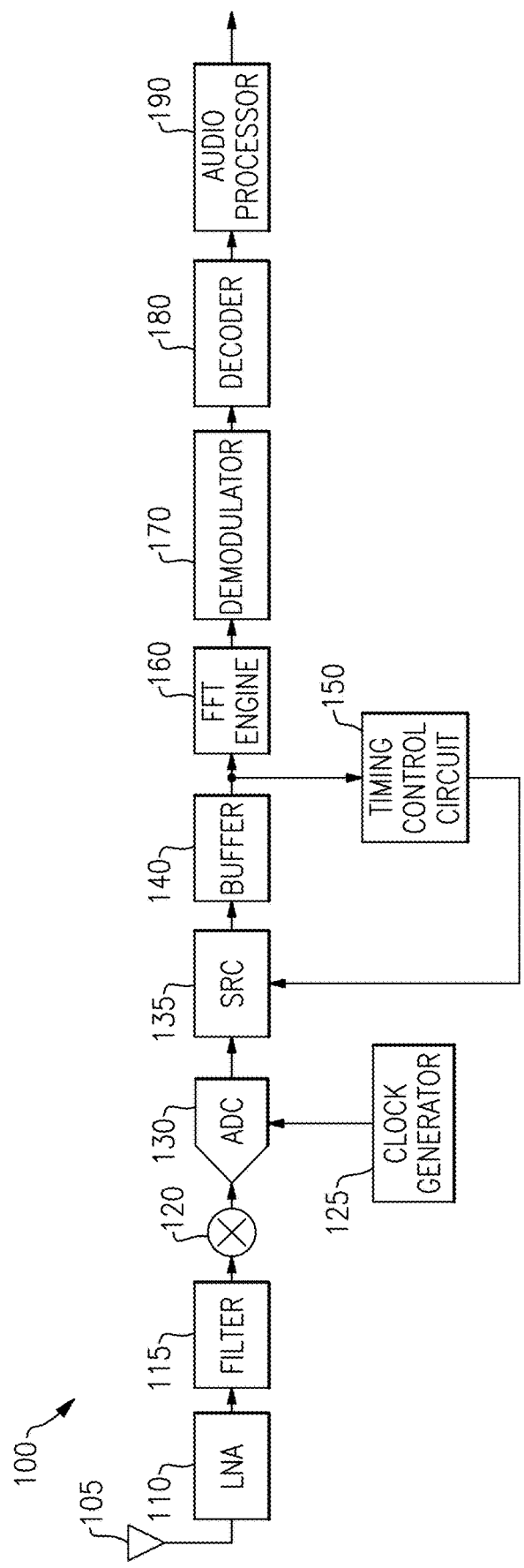
FIG. 7A is a block diagram of a representative receiver in accordance with embodiments, in which the receiver jointly corrects STO and SRO by controlling a sample rate converter.
Figure 7B:
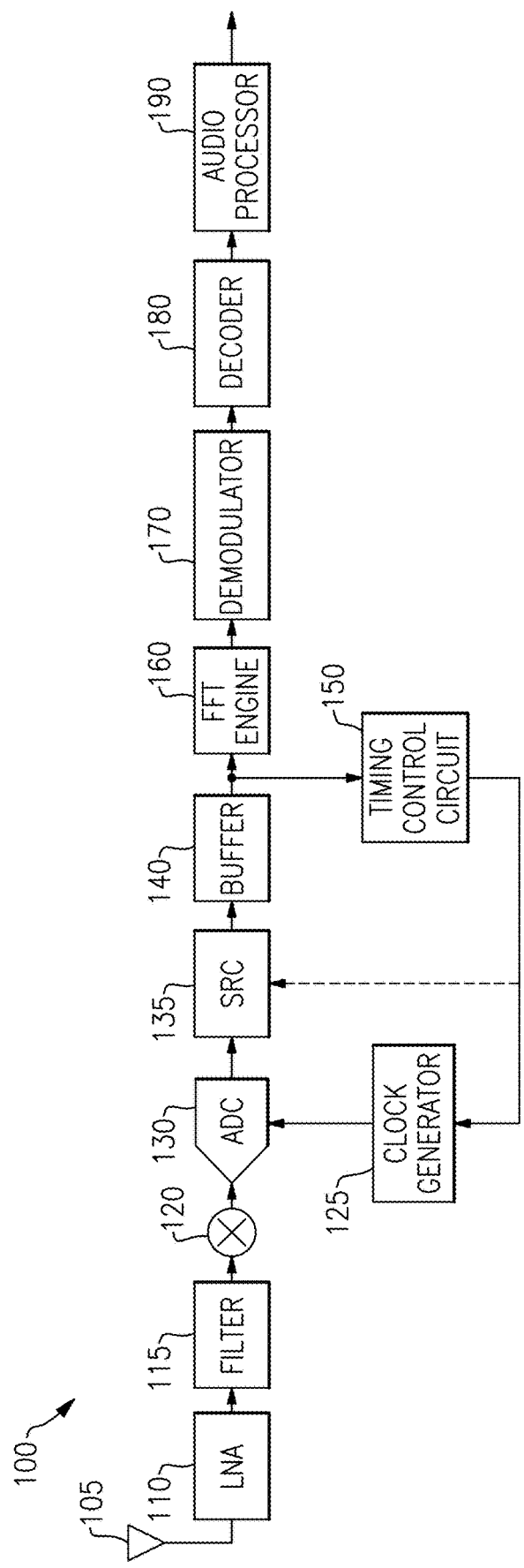
FIG. 7B is a block diagram of a representative receiver in accordance with embodiments, in which the receiver jointly corrects STO and SRO by controlling a sampling clock.

FIG. 7A shows an example of a receiver that incorporates the half-CP algorithm to jointly correct STO and SRO timing impairments by controlling a sample rate converter to adjust OFDM sample timing, e.g., while maintaining a fixed system clock. FIG. 7B shows an example of a receiver that incorporates the half-CP algorithm to jointly correct STO and SRO timing impairments by controlling a clock frequency of a shared LCO.

Referring to both FIGS. 7A and 7B, embodiments can be incorporated in different types of receiver systems. In some embodiments, receiver 100 may be a single-die integrated circuit such as a CMOS die having mixed signal circuitry including both analog and digital circuitry. The receiver 100 may include a signal processing path having various components. Many of the components can be similar to or the same as the similarly named and numbered components of FIG. 2.

An incoming radio frequency (RF) signal received via antenna 105 is provided to a low noise amplifier (LNA) 110, which amplifies the RF signal. In turn, LNA 110 is coupled to a filter 115, which may filter the received RF signal. While shown with two RF front end blocks (LNA 110 and filter 115), the receiver 100 may include additional RF front end circuitry in other examples. In turn, the filtered RF signal can be provided to a mixer 120, which in an embodiment may be implemented as a complex mixer. In embodiments herein, the mixer 120 may downconvert the RF signal to a lower frequency signal using a mixing signal (not shown). In a particular embodiment, this lower frequency signal may be, e.g., a low-intermediate frequency (IF) or zero-IF signal. This downconverted signal can be an in-phase/quadrature phase (IQ) signal.

The resulting downconverted signal can be provided to an analog-to-digital converter (ADC) 130, where the signal can be digitized into a digital signal at a sampling rate according to a clock signal received from a clock generator 125. In an embodiment, the clock generator 125 may be implemented as a local oscillator, phase lock loop or other such clock generation circuit. In an embodiment in which the sampling clock signal and mixing signal are at the same frequency, clock generator 125 also may provide the mixing signal to mixer 120. In some embodiments, either before or after digitization, channelization may be performed to generate a channelized signal. In an OFDM system, a plurality of samples forms an OFDM symbol of an incoming data stream.

The receiver 100 further includes a sample rate converter (SRC) 135, which receives the digitized signals from the ADC 130. The SRC 135 can be an asynchronous or arbitrary sample rate converter that receives incoming digitized samples at an arbitrary frequency (e.g., under microcontroller control), resamples the samples, and outputs the samples according to a fixed frequency, e.g., the virtual frequency at which downstream processing components operate. In some embodiments, SRC 135 implements a Farrow variable digital filter structure with coefficients varied by means of a control variable, although other types of SRCs are possible.

Referring still to both FIG. 7A and FIG. 7B, The SRC 135 provides the resampled samples to a buffer 140, which may be implemented as a first in first out (FIFO) 140. The incoming samples stored in buffer 140 and are then output to a main digital signal processing path including a fast Fourier transform (FFT) engine 160, which generates frequency domain OFDM symbols from incoming time domain OFDM symbols. In one embodiment, each incoming time domain OFDM symbol can be processed by FFT engine 160 into a plurality of sub-carriers. Note that the number of sub-carriers corresponding to a given OFDM symbol may vary depending upon bandwidth of signal and a time duration of the OFDM symbol (without a cyclic prefix).

The incoming time domain OFDM symbols stored in buffer 140 also may be provided to a timing control circuit 150. In embodiments herein, timing control circuit 150 may be configured to perform timing estimation to determine a synchronization of the OFDM symbols. In this way, the symbols can be provided to downstream digital processing circuitry in correct synchronization.

The sub-carrier outputs from FFT engine 160 form a frequency domain symbol that in turn is provided to a demodulator 170, which may demodulate the incoming sub-carriers and provide demodulated sub-carriers. In an embodiment, demodulator 170 may be a sub-symbol decoder to produce soft information (e.g., 1 bit per carrier in 2 PAM, 2 bits per carrier in QPSK, 4QAM, etc.) per sub-carrier. In turn, the demodulated sub-carriers may be provided to a decoder 180, where error correction and information bit extraction is performed. In turn, the resulting demodulated signal may be provided to an audio processor 190 for audio processing. The encoded audio signal is then provided to an audio source decoder (not shown for ease of illustration) to generate source audio. In the case of a data link, information bits may be provided to a data processor. Although shown as individual components, portions of the receiver 100 after ADC 130 to the end of the signal processing path of FIGS. 7A and 7B can be implemented in a digital signal processor (DSP).

In other implementations are possible, and additional circuitry can be present. For example, in some embodiments, additional circuitry including a deinterleaver, depuncturer, and a forward error correction (FEC) decoder may be present, to strip parity bits and provide the information bits. In addition, a timing control circuit may be configured in other types of hardware, may be realized via combinations of hardware, firmware, and/or software, and also may be implemented within a microcontroller or DSP.

Referring now to only FIG. 7A, while embodiments may vary, in the receiver 100 illustrated in FIG. 7A, the timing control circuit 150 determines a timing estimate and provides control signals to the SRC 135 to control and adjusting timing. As such, timing control circuit 150 acts as a feedback circuit to control timing based on the OFDM symbols themselves. According to certain embodiments, only a portion of an OFDM symbol, namely a CP and a limited guard band around this CP, is used to estimate timing, and provide joint STO/SRO compensation as described further below, e.g., with respect to FIGS. 8-12.

Referring now to only FIG. 7B, the timing control circuit 150 according to the illustrated embodiment jointly corrects STO/SRO by determining a timing estimate and providing control signals to the clock generator 125 to directly adjust a frequency of an LCO clock signal provided to the ADC 130. As indicated by the dashed line, the timing control circuit 150 can in some embodiments be configured jointly correct STO/SRO by adjusting either the SRC 135 or the clock generator 125. For example, the receiver can be programmed to correct the timing impairments by adjusting the SRC 135 or alternatively programmed to correct the timing impairments using the clock generator 125.

In further embodiments, the timing control circuit 150 jointly corrects STO/CFO by controlling the clock generator 125 to adjust a frequency of an LCO clock provided to the ADC 130, while controlling the SRC 135 as an integer resampler (e.g., performing decimation/interpolation by integer value). In further embodiments, the timing control circuit 150 implements a multi-stage correction process, e.g., first controlling the clock generator 125 in a first stage to adjust a frequency of an LCO clock provided to the ADC 130 to update the clock frequency until the error is steady state tracked, at which point the timing control circuit 150 controls the SRC 135 in a second stage to correct the error in a smaller region, e.g., for fine correction. In yet further embodiments, the timing control circuit 150 controls the clock generator 125 to correct an integer aspect of the error and controls the SRC 135 to correct in a fractional aspect of the error.

In certain implementations, it can be beneficial to correct error exclusively or primarily by controlling the SRC 135 instead of by controlling the clock generator 125, such as where the system includes a monolithic chip and certain downstream operations (e.g., audio processing, off-chip communications, or the like) are affected by controlling the LCO clock. In such cases, controlling the SRC 135 can avoid impacting downstream operations.

Figure 8:
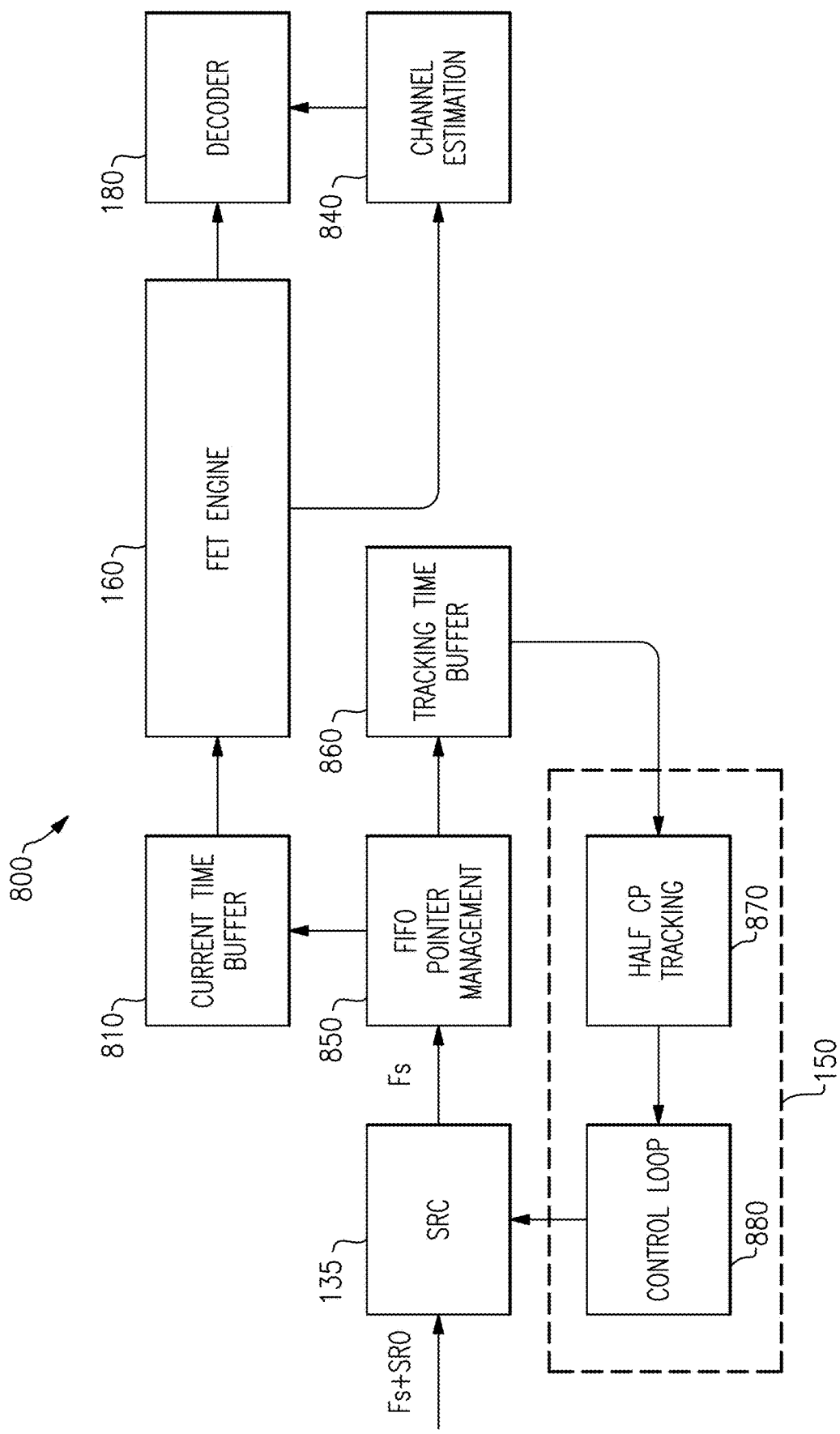
FIG. 8 illustrates portions of a receiver in accordance with embodiments, e.g., portions of the receiver of FIG. 7A.

FIG. 8 shows portions of a receiver 800, which can be portions of the receiver 100 of FIG. 7A, for example. For instance, referring to both FIGS. 7A and 8, according to certain embodiments, the FIFO pointer manager 850 and current time buffer 810 of FIG. 8 can together comprise some or all of the buffer 140 of FIG. 7A.

The received signal with impaired sample rate Fs+SRO from the ADC (not shown in FIG. 8) is fed through the SRC 135 and the OFDM demodulator operates at the output rate of the SRC 135, which upon initial synchronization frame alignment can be initialized to 0 STO and 0 SRO given the reference sampling frequency Fs.

The FIFO pointer manager 850 can be split into two active buffer domains: current_time and tracking_time, to control a current time buffer 810 and tracking time buffer 860. The FIFO pointer manager 850 outputs two pointers, the current time pointer, corresponding to the current time buffer 810, and a tracking time pointer, corresponding to the tracking time buffer 860, which can point to the same physical buffer in memory but can point to different locations at any given point in time.

For example, at initialization, the pointers can point to the same location, and the FIFO pointer manager 850 moves the current time pointer one OFDM symbol worth of samples each time a symbol is processed by the CP removal and demapping block 830, on a symbol basis. The FIFO pointer manager 850 can adjust the tracking time pointer, on the other hand, to move from the current time tracking pointer by a distance proportional to the output of the control loop 880, based on the operation of the timing control loop 150.

The resampled samples from the SRC 135 are provided to the current time buffer 810, e.g., of length N samples, which can work with one symbol of OFDM information at a time. The current time buffer 810 is controlled by the FIFO pointer manager 850 to output the symbol for CP, FFT, and FFT demapping by the P/S converter 820 and CP removal and demapping block 830, and the respective pilot or data carriers are output for later channel estimation and decoding respectively. For example, the sample length N can be selected to satisfy the equation: $N >= N_{CP} + N_{FFT} + 2*L$.

The current time buffer 810 provides the samples to the FFT engine 160, which can perform CP removal, FFT, and FFT demapping. The FFT engine 160 passes the symbol data to the decoder 180, which can perform error correction and information bit extraction. The FFT engine 160 can also provide the signal to the channel estimation block 840, which estimates the channel. While not shown in FIG. 8, the system 800 can also include a demodulator and/or audio processor like the demodulator 170 and audio processor 190 of FIG. 7A.

The resampled samples are provided from the SRC 135 to the tracking time buffer 860, which is controlled by the FIFO pointer manager 850. The tracking time buffer 860 can be configured to process each OFDM symbol and a portion of the previous and future symbol. For example, the tracking time buffer 860 can process each portion of length L samples, making a contiguous set of samples of length N+2L.

The tracking time buffer 860 outputs OFDM symbols to the timing control circuit 150, which includes a half CP tracking block 870 followed by a control loop block 880. The half CP tracking block 870 receives the OFDM symbols from the tracking time buffer 860 and performs half CP tracking to generate a timing control signal. For instance, the half CP block 870 can compare the power in the left half and the right half of the tracking time buffer 860 and accumulate the number of times the correlation is larger in left half and right half respectively. Depending on the embodiment, the half CP tracking block 870 can be similar to or the same as the timing control circuit 150 of FIG. 2, the timing control circuit 200 of FIG. 3, and can perform the methods of FIGS. 4, 5, and/or 6, or can be similar to or the same as any of the devices and methods disclosed herein for performing half-CP tracking.

The control loop 880 receives the timing control signal from the half CP tracking block 870 and is configured to provide a control signal to the SRC 135 to modify the system sample rate to jointly track SRO and STO. For example, the control loop 880 can receive from the half CP tracking 870 block the difference between the total count of left vs right half in the tracking time buffer, and provide a timing control signal to the SRC 135, and the SRC 135 and/or the FIFO pointer manager 850 operate to move the read pointer of the tracking time buffer 860 to adjust the sample rate and jointly track and compensate for SRO and STO. This can be in contrast to other embodiments, such as that of FIG. 2, which adjust symbol timing by adjusting the read pointer of the buffer 140 via sample incrementation, thereby correcting for STO, but not SRO.

L can be chosen to be sufficiently large to support the desired STO impairment correction range but not too large that it will extend into the CP correlation region of the previous/future symbol. The SRO offset that can be corrected may be directly related to the overlap size chosen for STO support: e.g., the larger the overlap size, the larger the PPM offset that can be corrected up to the point where the SRO+STO is larger than the tracking rate of the control loop.

When there are enough iterations of the half-CP routine performed by the half CP tracking block 870 that one half is greater than the other (e.g., 10 iterations the left half has more power than the right half), the FIFO pointer manager 850 controls the tracking time buffer 860 pointer to shift the pointer in the direction of the half with the larger count by changing the SRC sampling rate. Changing the sample rate to move the pointer can either insert fractional samples or consume fractional samples to correct the current_time buffer 810 SRO impairment while continuing to track out the STO impairment.

Figure 9:
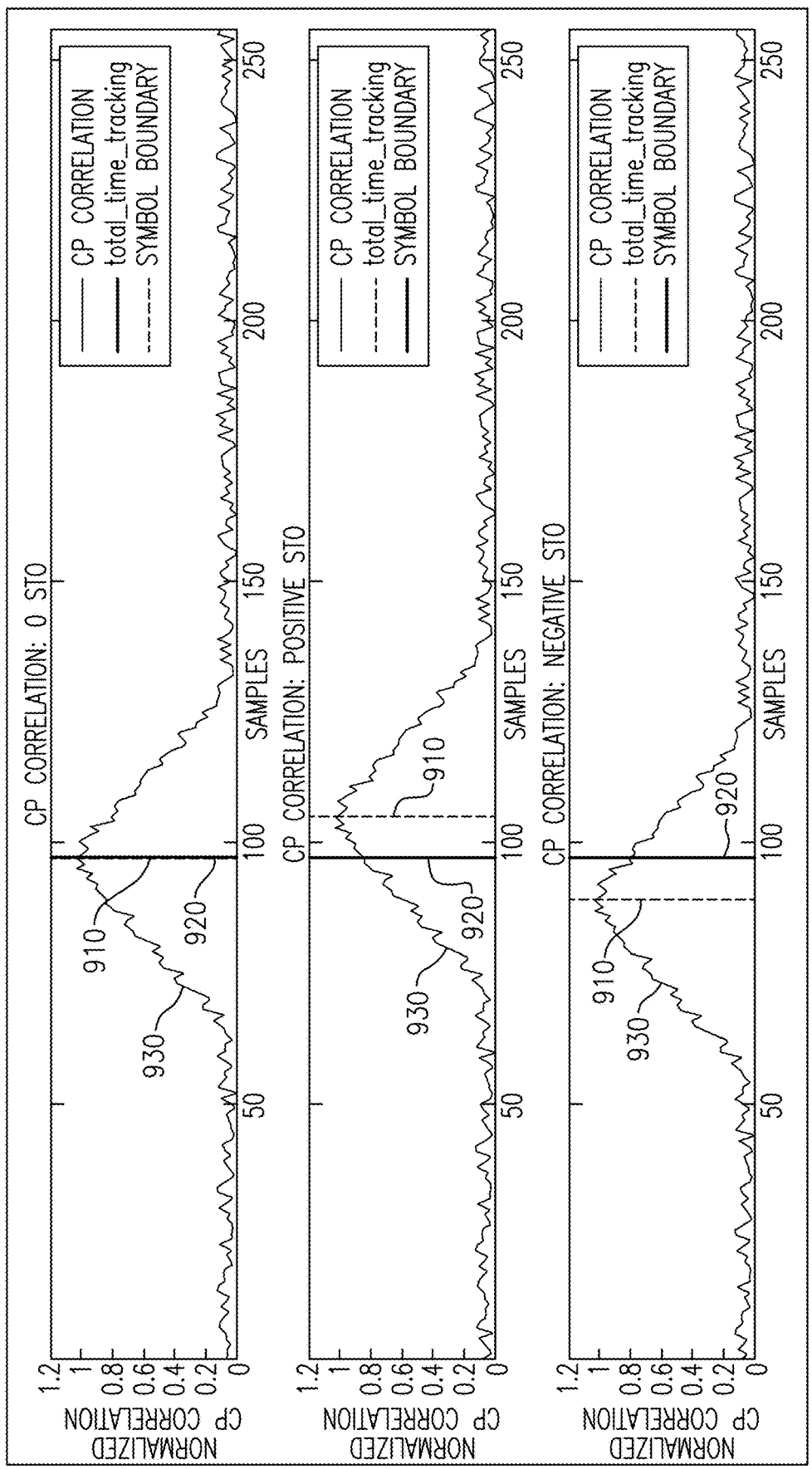
FIG. 9 illustrates normalized cyclic prefix correlation output for certain symbol timing offset impairments.

As shown in FIG. 9, the tracking_time pointer will continue to move until a steady state number is reached in each half thus reducing the STO where the desired symbol boundary 910 is found. Then, the loop continues to track the half-CP which causes the SRC compensation to converge the SRO correction rate therefore bringing the tracking_time pointer 910 distance relative to the current_time_tracking pointer 920 to zero. FIG. 9 illustrates normalized CP correlation output 930 for three different STO impairment values.

Figure 10:
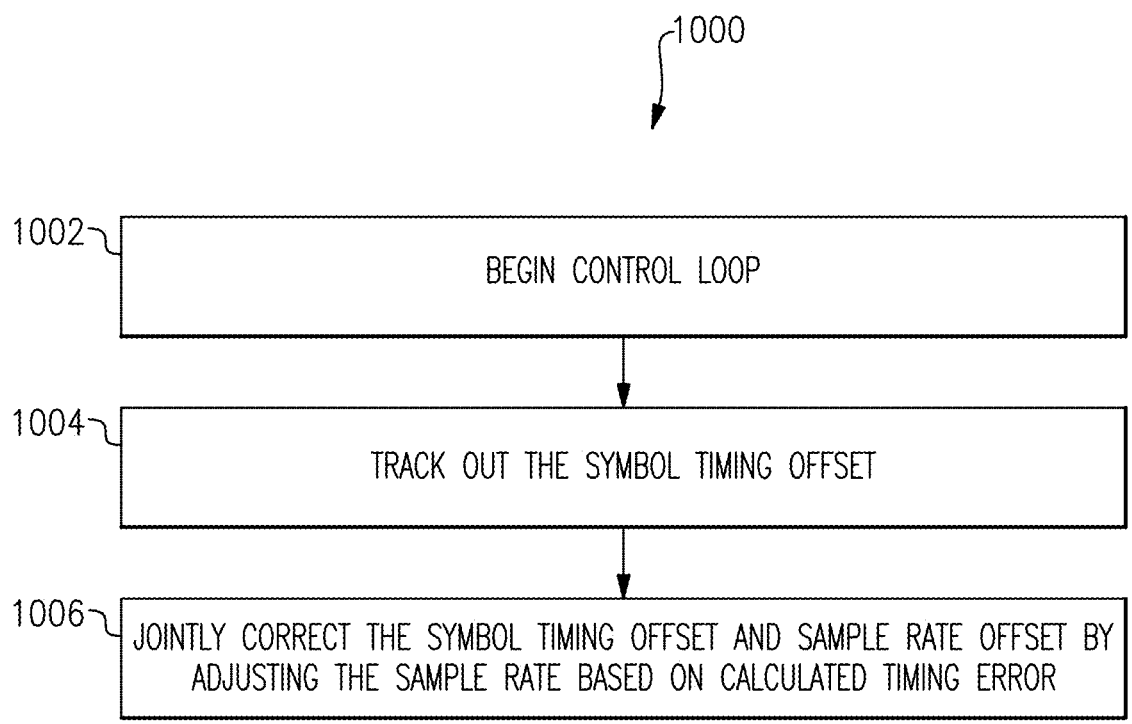
FIG. 10 is a flow diagram of a timing estimate method in accordance with another embodiment, for jointly tracking and correcting symbol timing offset and symbol rate offset.
Figure 11:
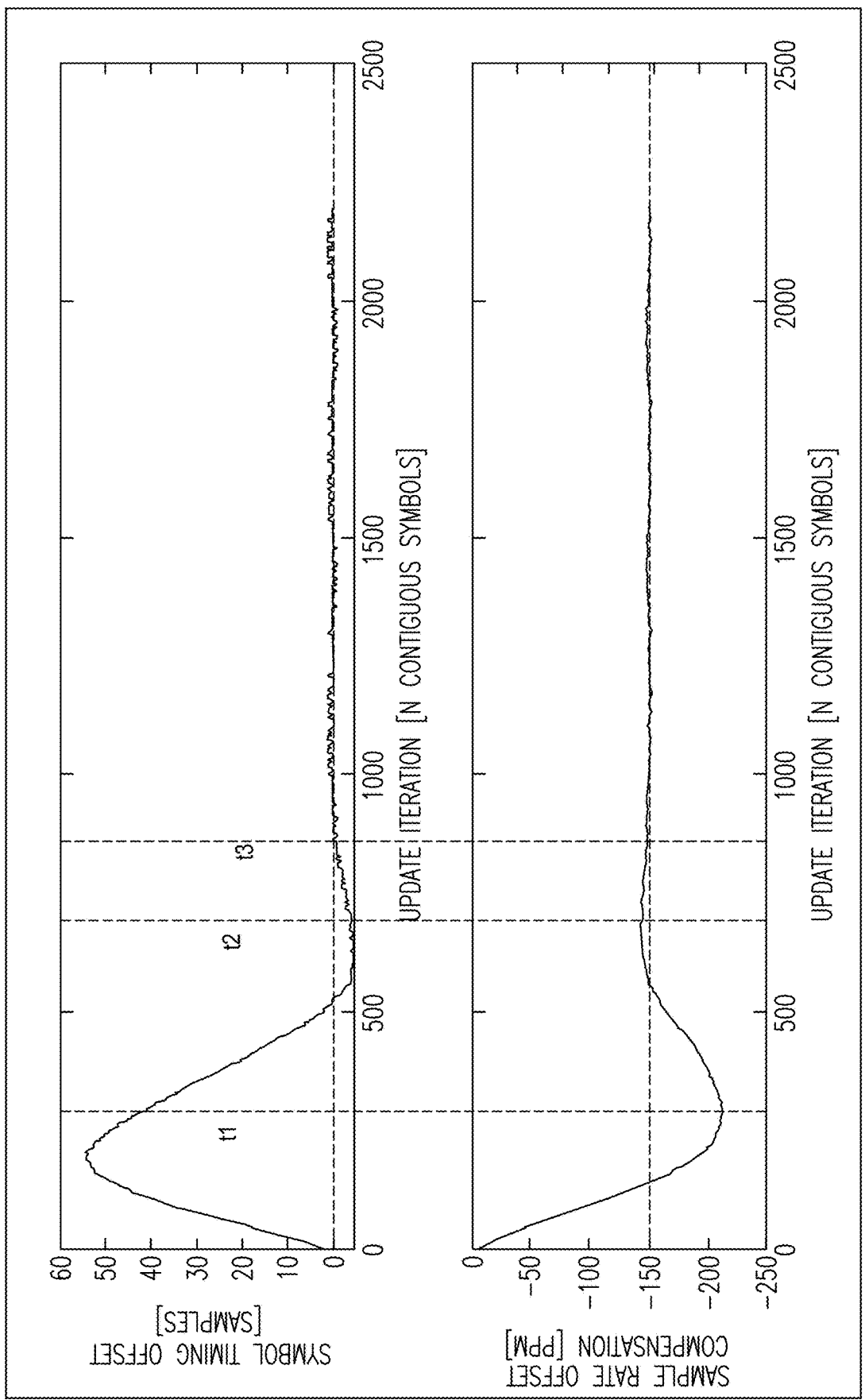
FIG. 11 illustrates performance of a joint symbol timing offset/symbol rate offset compensation loop according to certain embodiments, for a 150 PPM impaired signal.

FIG. 10 is a flowchart of an example method 1000 for jointly tracking and correcting STO and SRO. The method 1000 can be performed by devices of FIGS. 7A, 7B, and/or 8, for example. FIG. 11 shows an example of how the symbol timing offset and symbol rate offset tracked and compensated for by the method 1000 for a received signal with 150 parts per million (PPM) SRO impairment and non-zero STO.

Referring to FIGS. 7A, 8, 10 and 11, at step 1002, the method 1000 begins the control loop. At step 1004, the method 1000 uses the output of the timing control circuit 150 to control the SRC 135 to under/down-sample the received signal (decrease the sample rate) and track out the STO, which in the example shown in FIG. 11 reaches a maximum value of between 50 and 60 samples. At step 1006, for an over-sampled signal, the method 1000 continues to use the output of the timing control circuit 150 to control the SRC 135 to under/down-sample the received signal (decrease the sample rate) to bring the STO towards zero. In this manner, the method 1000 jointly corrects the symbol timing offset and sample rate offset by continuing to adjust the sample rate based on the timing error output by the timing control circuit 150.

Conversely, at step 1006, if the received signal were under-sampled instead of being over-sampled as in the example of FIG. 11, the method 1000 could control the SRC 135 to over/up-sample (increase the sample rate) to bring the STO towards zero. In some embodiments, the timing control circuit 150, for an over-sampled received signal, could alternatively or additionally control the clock generator 125 to lower the frequency of an LCO clock of the ADC to reduce the STO, or for an under-sampled received signal, could alternatively or additionally control the clock generator 125 to increase the frequency of an LCO clock of the ADC to reduce the STO. In the example illustrated by the plot of FIG. 11, at step 1006, the method 1000 jointly corrects the STO with the SRO by the inverse sample rate amount of −150 PPM. During this step the timing control circuit 150 can control the SRC 135 to adjust the sample rate based on the timing control signal received from the timing control circuit 150. For example, while convergence is happening, the timing control circuit 150 can control the SRC 135 to converge the SRO impairment rate without ever having to directly move the pointer of the current time tracking buffer 810, but rather by controlling the SRC 135 to cause alternating up/down sampling of the reference sample rate to move the pointer of the current time tracking buffer 810 indirectly, until converging at −150 PPM SRO compensation in the example of FIG. 11.

For instance, referring to Equations 3, 4, and 5 above, when accumulated Terr calculated by the timing control circuit 150 is positive, corresponding to more right peaks than left peaks, the timing control circuit 150 can control the SRC 135 to over-sample the received signal. This would cause the number of right peaks to decrease and the number of left peaks to increase until the accumulated Terr approaches zero. Conversely, if accumulated Terr is negative, corresponding to more left peaks than right peaks, the timing control circuit 150 can control the SRC to under-sample the received signal, causing the number of left peaks to decrease and the number of right peaks to increase until Terr approaches zero. Referring specifically to the illustrated example of FIG. 11, at steps 1004 and 1006 the control loop block 880 uses the output of the half CP tracking block 870 to jointly converge the symbol timing offset to zero and the sample rate offset compensation to −150 PPM to compensate for the 150 PPM sample rate offset of the received signal. In particular, from time 0 to about time t1, the output of the half CP tracking block 870 (accumulated error is negative) causes the control loop block 880 to determine to generally under-sample (decrease the sample rate). During this period of time, the sample rate generally decreases, bringing the sample rate offset compensation to about −200 PPM. At about time t1, the output of the output of the half CP tracking block 870 (accumulated error starts to become positive) causes the control loop block 880 to determine to generally over-sample the signal (increase the sample rate) from about time t1 to about time t2. During this period of time, the sample rate generally increases, bringing the sample rate offset compensation from about −200 PPM to about −140 PPM. At about time t2, the output of the half CP tracking block 870 (accumulated error starts to become negative again) causes the control loop block 880 to determine to generally under-sample the signal again (decrease the sample rate) from about t2 to about t3, bringing the sample rate compensation back to about −150 PPM. At about t3, the symbol timing offset converges at 0 and the sample rate offset compensation converges to about −150 PPM. From t3 onward, following convergence, the output of the half CP tracking block 870 will generally cause the control loop block 880 to jitter about the convergence point, alternating between controlling the SRC 135 to under-sample and over-sample. The method 1000 may in some embodiments follow a process similar to the method 500 of FIG. 6, for example, where the steps 540 and 560 of the method 500 of FIG. 6 correspond to adjusting the sample rate of the SRC 135 in first and second directions, or, depending on the embodiment, adjusting the frequency of an LCO clock of the ADC 130. Moreover, the threshold used at steps 530 and 550 can be tuned as a tradeoff between faster convergence (smaller threshold) and smaller jitter (larger threshold). For example, a threshold value of zero would lead to fast convergence but relatively larger jitter. The threshold can depend on the implementation. For example, the threshold in various embodiments can be less than or equal to 20, less than or equal to 10, or less than or equal to 5, although other values including values higher than 20 are possible.

Depending on the embodiment, with moderate STO the method 1000 can, in an DRM implementation, track and correct over 200 PPM SRO impairments in the AM band with less overhead and cycles than the previous solution. The method 1000 can overall reduce total system complexity by removing one or more tracking loops, simplifying timing related impairments into a novel correction factor from a single OFDM symbol, and leveraging less noisy timing estimations to converge to impairment reduction at a quicker rate.

While the present invention has been described with respect to a limited number of embodiments, those skilled in the art will appreciate numerous modifications and variations therefrom. It is intended that the appended claims cover all such modifications and variations as fall within the true spirit and scope of this present invention.

Figure 12:
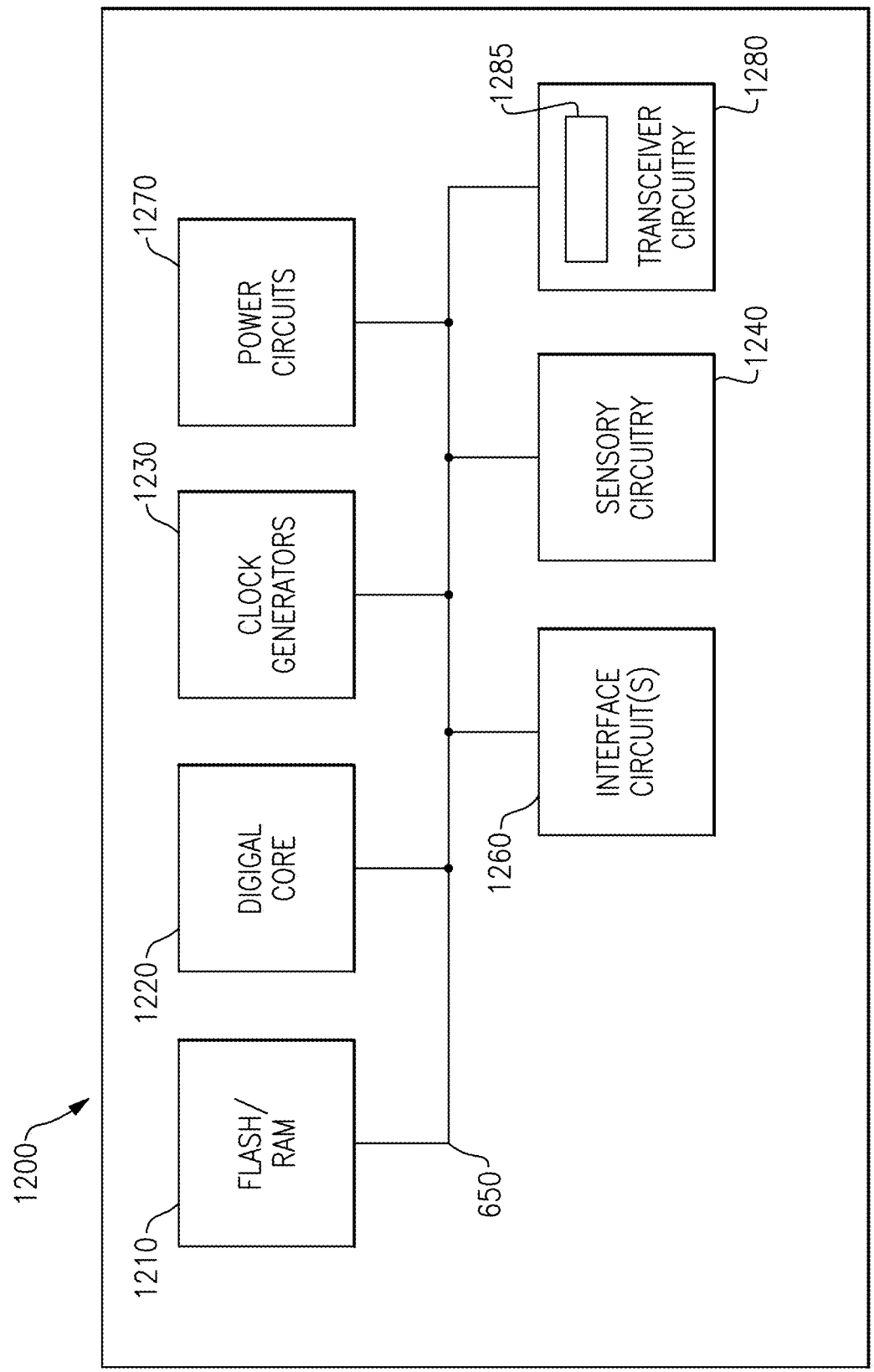
FIG. 12 is a block diagram of a representative device in accordance with an embodiment.

Embodiments may be implemented in many different types of end node devices. Referring now to FIG. 12, shown is a block diagram of a representative device 1200 which may be a given wireless device. In the embodiment shown in FIGS. 7A, 7B, and 8 device 1200 may be a standalone radio, or a radio incorporated into another device such as a sensor, actuator, controller or other device that can be used in a variety of use cases in a wireless control network, including sensing, metering, monitoring, embedded applications, communications applications and so forth.

In the embodiment shown, device 1200 includes a memory system 1210 which in an embodiment may include a non-volatile memory such as a flash memory and volatile storage, such as RAM. In an embodiment, this non-volatile memory may be implemented as a non-transitory storage medium that can store instructions and data, including code for performing methods including the methods of the flowcharts of FIGS. 4-6 and 10 or the techniques performed by the systems of FIGS. 2, 3, 7A, 7B, and 8.

Memory system 1210 couples via a bus 1250 to a digital core 1220, which may include one or more cores and/or microcontrollers that act as a main processing unit of the device. As further shown, digital core 1220 may couple to clock generators 1230 which may provide one or more phase locked loops or other clock generation circuitry to generate various clocks for use by circuitry of the device.

As further illustrated, device 1200 further includes power circuitry 1270, which may include one or more voltage regulators. Additional circuitry may optionally be present depending on particular implementation to provide various functionality and interaction with external devices. Such circuitry may include interface circuitry 1260 which may provide interface with various off-chip devices, sensor circuitry 1240 which may include various on-chip sensors including digital and analog sensors to sense desired signals, such as speech inputs, image inputs, environmental inputs or so forth.

Transceiver circuitry 1280 may be provided to enable transmission and receipt of wireless signals, e.g., according to one or more digital radio communication standards such as DAB, DRM or HD™ radio, local area wireless communication schemes, such as a given IEEE 802.11 scheme, wide area wireless communication scheme such as LTE or 5G, among others. And as shown transceiver circuitry 1280 includes a timing control circuit 1285, which may perform timing estimates as described herein. While shown with this high-level view, many variations and alternatives are possible.

Any of the embodiments described above can be implemented in association with mobile devices such as cellular handsets. The principles and advantages of the embodiments can be used for any systems or apparatus, such as any uplink wireless communication device, that could benefit from any of the embodiments described herein. The teachings herein are applicable to a variety of systems. Although this disclosure includes example embodiments, the teachings described herein can be applied to a variety of structures. Any of the principles and advantages discussed herein can be implemented in association with RF circuits configured to process signals having a frequency in a range from about 30 kHz to 300 GHz, such as in a frequency range from about 400 MHz to 8.5 GHz or in a frequency range from about 400 MHz to 5 GHz.

Aspects of this disclosure can be implemented in various electronic devices. Examples of the electronic devices can include, but are not limited to, consumer electronic products, parts of the consumer electronic products such as packaged radio frequency modules, uplink wireless communication devices, wireless communication infrastructure, electronic test equipment, etc. Examples of the electronic devices can include, but are not limited to, a mobile phone such as a smart phone, a wearable computing device such as a smart watch or an ear piece, a telephone, a television, a computer monitor, a computer, a modem, a hand-held computer, a laptop computer, a tablet computer, a microwave, a refrigerator, a vehicular electronics system such as an automotive electronics system, a robot such as an industrial robot, an Internet of things device, a stereo system, a digital music player, a radio, a camera such as a digital camera, a portable memory chip, a home appliance such as a washer or a dryer, a peripheral device, a wrist watch, a clock, etc. Further, the electronic devices can include unfinished products.

Conditional language used herein, such as, among others, "can," "could," "might," "may," "e.g.," "for example", "such as" and the like, unless specifically stated otherwise, or otherwise understood within the context as used, is generally intended to convey that certain embodiments include, while other embodiments do not include, certain features, elements and/or states. The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively.

The examples shown in the figures illustrate the filter components or filtering stages as discrete "blocks". Those skilled in the art will appreciate, given the benefit of this disclosure, that any or all of the filters shown in the various examples may be made up of many stages and/or combined or share components in different physical implementations. Accordingly, the examples shown are intended to be functional illustrations and not limiting in any aspect with respect to actual implementations of the radio frequency circuit assembly or front-end module. Aspects and embodiments provide a noise cancellation approach that can be designed into the overall front-end module configuration such that the overall filter out-of-band attenuations required can be relaxed, requirements on some or all the filter sections may be relaxed to provide more optimal and lower insertion losses, and the net insertion loss and out-of-band attenuation/isolation properties of the entire front-end module may exhibit less loss, more isolation, and more out-of-band attenuation where desired.

While certain embodiments have been described, these embodiments have been presented by way of example only, and are not intended to limit the scope of the disclosure. Indeed, the novel resonators, filters, modules, devices, wireless communication devices, apparatus, and systems described herein may be embodied in a variety of other forms. Furthermore, various omissions, substitutions and changes in the form of the resonators, filters, modules, devices, wireless communication devices, apparatus, and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and/or acts of the various embodiments described above can be combined to provide further embodiments. Accordingly, the foregoing description and drawings are by way of example only, and the scope of the disclosure should be determined from proper construction of the appended claims, and their equivalents.

What is claimed is:

1. A receiver configured to jointly correct sample rate offset and symbol timing offset, comprising:
    a sample rate converter configured to output one or more samples of one or more orthogonal frequency division multiplexing symbols;
    a first buffer configured to store first samples of the one or more samples corresponding to a current symbol;
    a fast Fourier transform engine configured to receive the first samples from the first buffer and convert the first samples into a plurality of frequency domain subcarriers;
    a second buffer configured to store second samples of the one or more samples corresponding to: a current symbol, a portion of a prior symbol, and a portion of a future symbol; and
    a timing control circuit configured to generate a timing error using the second samples and to jointly correct sample rate offset and symbol timing offset by control of the sample rate converter to adjust a sample rate of the one or more orthogonal frequency division multiplexing symbols based at least in part on the timing error, and further configured to generate the timing error based at least in part on a difference between a first correlation sum for a first portion of a cyclic prefix of a first one of the one or more symbols and a second correlation sum for a second portion of the cyclic prefix.

2. The receiver of claim 1 wherein the timing control circuit is configured to control the sample rate converter to adjust the sample rate according to a difference between the first correlation sum and the second correlation sum of the one or more orthogonal frequency division multiplexing symbols received via a multi-path channel.

3. The receiver of claim 1 wherein the timing control circuit is configured to control the sample rate converter to adjust the sample rate until the first correlation sum is at least substantially equal to the second correlation sum.

4. The receiver of claim 1 wherein the timing control circuit includes a cyclic prefix correlator configured to calculate first cyclic prefix correlations for the first portion of the cyclic prefix and second cyclic prefix correlations for the second portion of the cyclic prefix, and to calculate first guard band correlations for one or more first guard band samples adjacent the first portion of the cyclic prefix and second guard band correlations for one or more second guard band samples adjacent the second portion of the cyclic prefix.

5. The receiver of claim 4 further comprising a summer configured to calculate the first correlation sum based on the first cyclic prefix correlations and the first guard band correlations, and to calculate the second correlation sum based on the second cyclic prefix correlations and the second guard band correlations.

6. The receiver of claim 1 wherein the timing control circuit is configured to determine a timing error based on a comparison of the first correlation sum and the second correlation sum.

7. The receiver of claim 1 wherein the timing control circuit is further configured to maintain a first count and a second count based on the timing error for a plurality of comparisons of the first correlation sum and the second correlation sum.

8. The receiver of claim 1 wherein the timing control circuit generates the timing error using a number of samples from the second buffer sufficiently large to correct a desired symbol timing offset impairment but not so large as to extend into a cyclic prefix correlation region of the prior symbol or the future symbol.

9. The receiver of claim 1 wherein adjustment of the sample rate converter causes movement of a pointer of the second buffer to jointly correct sample rate offset and symbol timing offset sample rate offset, without moving a pointer of the first buffer.

10. A wireless communication device comprising:
an antenna;
transceiver circuitry in communication with the antenna and configured to configured to receive one or more orthogonal divisional multiplexing signals from the antenna, the transceiver circuitry including: a sample rate converter configured to output one or more samples of one or more orthogonal frequency division multiplexing symbols; a first buffer configured to store first samples of the one or more samples corresponding to a current symbol; a fast Fourier transform engine configured to receive the one or more samples from the first buffer and convert the first samples into a plurality of frequency domain sub-carriers; a second buffer configured to store second samples of the one or more samples corresponding to a current symbol, a portion of a prior symbol, and a portion of a future symbol; and a timing control circuit configured to generate a timing error using the second samples, and to jointly correct sample rate offset and symbol timing offset by control of the sample rate converter to adjust a sample rate of the one or more orthogonal frequency division multiplexing symbols based at least in part on the timing error, and further configured to generate the timing error based at least in part on a difference between a first correlation sum for a first portion of a cyclic prefix of a first one of the one or more symbols and a second correlation sum for a second portion of the cyclic prefix.

11. The wireless communication device of claim 10 wherein the timing control circuit is configured to control the sample rate converter to adjust the sample rate according to a difference between the first correlation sum and the second correlation sum of the one or more orthogonal frequency division multiplexing symbols received via a multi-path channel.

12. The wireless communication device of claim 10 wherein the timing control circuit is configured to control the sample rate converter to adjust the sample rate until the first correlation sum is at least substantially equal to the second correlation sum.

13. The wireless communication device of claim 10 wherein the timing control circuit includes a cyclic prefix correlator configured to calculate first cyclic prefix correlations for the first portion of the cyclic prefix and second cyclic prefix correlations for the second portion of the cyclic prefix, and to calculate first guard band correlations for one or more first guard band samples adjacent the first portion of the cyclic prefix and second guard band correlations for one or more second guard band samples adjacent the second portion of the cyclic prefix.

14. The wireless communication device of claim 13 further comprising a summer configured to calculate the first correlation sum based on the first cyclic prefix correlations and the first guard band correlations, and to calculate the second correlation sum based on the second cyclic prefix correlations and the second guard band correlations.

15. The wireless communication device of claim 10 wherein the timing control circuit is configured to determine a timing error based on a comparison of the first correlation sum and the second correlation sum.

16. The wireless communication device of claim 10 wherein the timing control circuit generates the timing error using a number of samples from the second buffer sufficiently large to correct a desired symbol timing offset impairment but not so large as to extend into a cyclic prefix correlation region of the prior symbol or the future symbol.

17. The wireless communication device of claim 10 wherein adjustment of the sample rate converter causes movement of a pointer of the second buffer to jointly correct sample rate offset and symbol timing offset sample rate offset, without moving a pointer of the first buffer.

18. A method of receiving orthogonal division multiplexing symbols, the method comprising:
receiving, in a receiver, a radio frequency signal;
processing, in the receiver, the radio frequency signal to obtain a plurality of orthogonal division multiplexing symbols, each of the plurality of orthogonal division multiplexing symbols including cyclic prefix samples and information samples;
storing in a first buffer first samples corresponding to a current symbol of the plurality of symbols, and converting the first samples from the buffer into a plurality of frequency domain sub-carriers;
storing in a second buffer second samples corresponding to a current symbol of the plurality of symbols, a portion of a prior symbol of the plurality of symbols, and a portion of a future symbol of the plurality of symbols;
using the second samples, determining a timing error based at least in part on a difference between a first correlation sum for a first portion of a cyclic prefix of a first one of the plurality of symbols and a second correlation sum for a second portion of the cyclic prefix; and
controlling a sample rate converter to adjust a sample rate of the plurality of orthogonal division multiplexing symbols based at least in part on the timing error, and to jointly correct sample rate offset and symbol timing offset.

19. The method of claim 18 wherein the timing error is determined using a number of samples from the second buffer sufficiently large to correct a desired symbol timing offset impairment but not so large as to extend into a cyclic prefix correlation region of the prior symbol or the future symbol.

20. The method of claim 18 wherein adjustment of the sample rate converter causes movement of a pointer of the second buffer to jointly correct sample rate offset and symbol timing offset sample rate offset, without moving a pointer of the first buffer.

* * * * *